(12) United States Patent
Sarkis et al.

(10) Patent No.: US 12,568,469 B2
(45) Date of Patent: Mar. 3, 2026

(54) TECHNIQUES FOR REQUESTING A TYPE OF COORDINATION INFORMATION

(71) Applicant: QUALCOMM Incorporated, San Diego, CA (US)

(72) Inventors: Gabi Sarkis, San Diego, CA (US); Junyi Li, Fairless Hills, PA (US); Tien Viet Nguyen, Bridgewater, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/485,141

(22) Filed: Sep. 24, 2021

(65) Prior Publication Data

US 2023/0098273 A1 Mar. 30, 2023

(51) Int. Cl.
| | |
|---|---|
| *H04W 72/02* | (2009.01) |
| *H04L 1/00* | (2006.01) |
| *H04W 72/20* | (2023.01) |
| *H04W 80/02* | (2009.01) |

(52) U.S. Cl.
CPC ........... *H04W 72/02* (2013.01); *H04L 1/0003* (2013.01); *H04W 72/20* (2023.01); *H04W 80/02* (2013.01)

(58) Field of Classification Search
CPC ..... H04W 72/02; H04W 72/20; H04W 80/02; H04L 1/0003
See application file for complete search history.

(56) References Cited

U.S. PATENT DOCUMENTS

| | | | |
|---|---|---|---|
| 2021/0045093 A1 | 2/2021 | Rao et al. | |
| 2022/0095280 A1* | 3/2022 | Farag | H04W 72/20 |
| 2022/0167345 A1* | 5/2022 | Jeong | H04W 72/54 |
| 2022/0322301 A1* | 10/2022 | Kiilerich Pratas | H04L 5/16 |
| 2022/0322359 A1* | 10/2022 | Ye | H04W 72/563 |
| 2022/0330267 A1* | 10/2022 | Hui | H04B 17/327 |
| 2022/0417919 A1* | 12/2022 | Shin | H04W 4/40 |
| 2023/0012983 A1* | 1/2023 | Zhang | H04W 72/25 |

(Continued)

OTHER PUBLICATIONS

3GPP TSG RAN WG1 meeting #106-e; R1-2106943, Source: CATT, GOHIGH e-Meeting, Title: Discussion on inter-UE coordination in sidelink mode 2; Aug. 16-27, 2021 (Year: 2021).*

(Continued)

*Primary Examiner* — Mohammed S Chowdhury
(74) *Attorney, Agent, or Firm* — QUALCOMM Incorporated

(57) ABSTRACT

Methods, systems, and devices for wireless communications are described. In some systems, a first user equipment (UE) may communicate with one or more other UEs in accordance with a distributed resource allocation mode. To select suitable resources for an intended sidelink transmission, the first UE may transmit, to a second UE, a request for a type of coordination information based on information associated with the intended sidelink transmission from the first UE. The second UE may generate coordination information in accordance with the requested type and may transmit the coordination information to the first UE. The first UE may use the coordination information to select a set of resources over which to perform the intended sidelink transmission from the first UE and may perform the intended sidelink transmission over the selected set of resources.

24 Claims, 13 Drawing Sheets

(56)          References Cited

U.S. PATENT DOCUMENTS

| | | | |
|---|---|---|---|
| 2023/0041458 A1* | 2/2023 | Zhao | H04W 72/20 |
| 2023/0056574 A1* | 2/2023 | Hwang | H04W 72/12 |
| 2023/0137259 A1* | 5/2023 | Hwang | H04W 72/40 |
| | | | 370/329 |

OTHER PUBLICATIONS

3GPP TSG RAN WG1 #106-e ; R1-2107303; Source: Panasonic; Title: Inter-UE coordination for Mode 2 enhancements, e-Meeting, Aug. 16-27, 2021. (Year: 2021).*

3GPP TSG RAN WG1 #106-e ; R1-2107761, Source: Apple; Title: Discussion on Inter-UE Coordination, e-Meeting, Aug. 16-27, 2021. (Year: 2021).*

3GPP TSG RAN WG1 #106-e; R1-2107782; Source: ZTE, Sanechips; Title: Discussion on the inter-UE coordination; e-Meeting, Aug. 16-27, 2021 (Year: 2021).*

3GPP TSG RAN WG1 #106-e; R1-2106715, Source: Spreadtrum Communications; Title: Discussion on inter-UE coordination in sidelink resource allocation ; e-Meeting, Aug. 16-27, 2021; (Year: 2021).*

3GPP TSG RAN WG1 #105-e ; R1-2105200; Source: ZTE, Sanechips; Title: Discussion on the inter-UE coordination; e-Meeting, May 10-27, 2021. See §2, §3. (Year: 2021).*

3GPP TSG RAN WG1 #105-e; R1-2104177; Source: Nokia, Nokia Shanghai Bell; Title: Inter-UE coordination in mode 2 sidelink resource allocation; e-Meeting, May 10-27, 2021. (Year: 2021).*

3GPP TSG RAN WG1 #103-e ; R1-2008879; Source: ZTE Corporation; Title: Inter-UE coordination in mode 2; e-Meeting, Oct. 26-Nov. 13, 2020 (Year: 2020).*

Fujitsu: "Considerations on Inter-UE Coordination for Mode 2 Enhancements", 3GPP TSG RAN WG1 Meeting #103-E, R1-2007788, 3rd Generation Partnership Project, Mobile Competence Centre, 650, Route Des Lucioles, F-06921 Sophia-Antipolis Cedex, France, vol. RAN WG1, No. e-Meeting, Oct. 26-Nov. 13, 2020, Oct. 23, 2020 (Oct. 23, 2020), XP051945292, pp. 1-20, Section 3.1-4.6, 1-5. International Search Report and Written Opinion—PCT/US2022/039618—ISA/EPO—Nov. 11, 2022.

* cited by examiner

Sub-channel

Frequency

Time

Slot

Reserved Resources 405

Reserved Resources 410

400

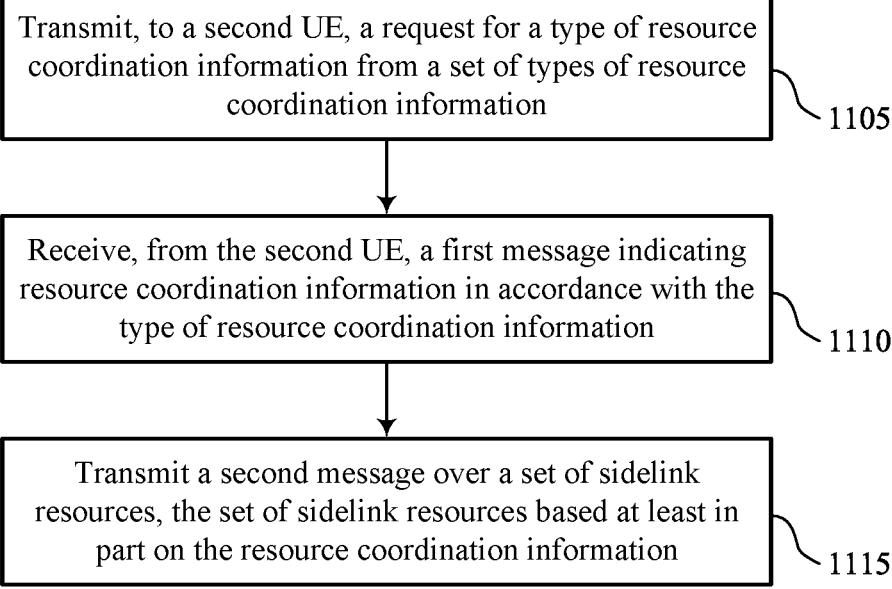

Transmit, to a second UE, a request for a type of resource coordination information from a set of types of resource coordination information

1105

Receive, from the second UE, a first message indicating resource coordination information in accordance with the type of resource coordination information

1110

Transmit a second message over a set of sidelink resources, the set of sidelink resources based at least in part on the resource coordination information

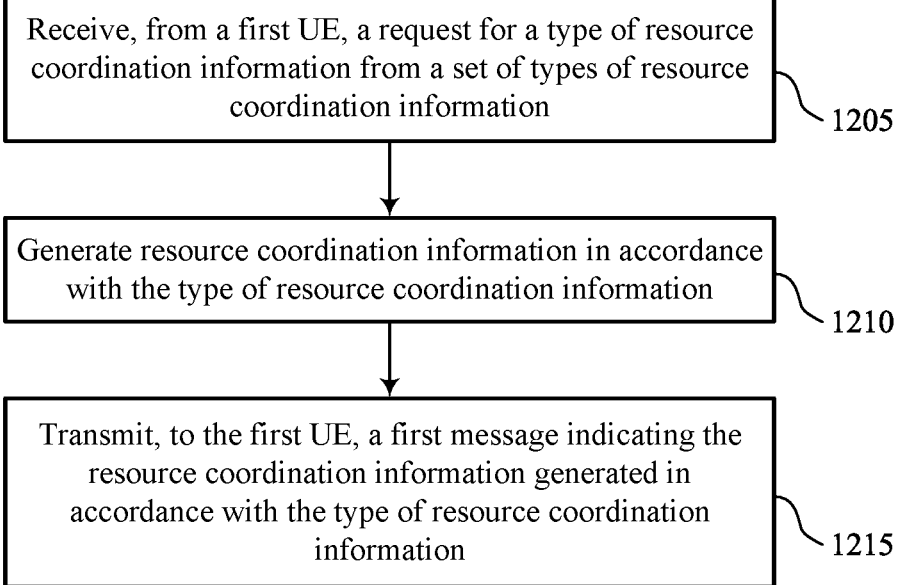

Receive, from a first UE, a request for a type of resource coordination information from a set of types of resource coordination information

1205

Generate resource coordination information in accordance with the type of resource coordination information

1210

Transmit, to the first UE, a first message indicating the resource coordination information generated in accordance with the type of resource coordination information

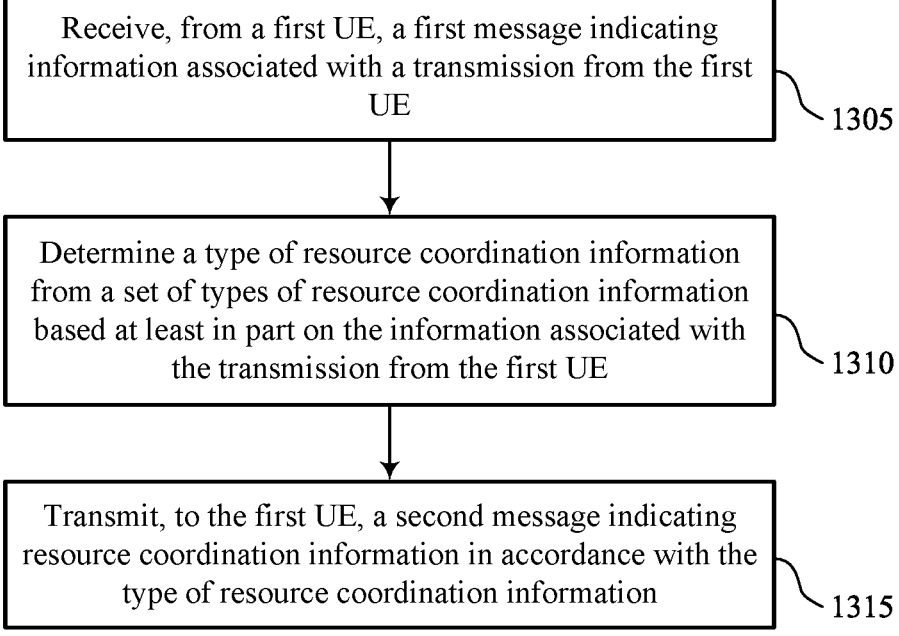

Receive, from a first UE, a first message indicating information associated with a transmission from the first UE

1305

Determine a type of resource coordination information from a set of types of resource coordination information based at least in part on the information associated with the transmission from the first UE

1310

Transmit, to the first UE, a second message indicating resource coordination information in accordance with the type of resource coordination information

TECHNIQUES FOR REQUESTING A TYPE OF COORDINATION INFORMATION

FIELD OF TECHNOLOGY

The following relates to wireless communications, including techniques for requesting a type of coordination information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, multiple UEs may communicate with each other via one or more sidelinks. The multiple UEs may select resources over which to transmit sidelink communication in accordance with various sidelink resource allocation modes, including a sidelink resource allocation mode 1 according to which the multiple UEs may receive an indication of which resources to use from a base station and a sidelink resource allocation mode 2 according to which the multiple UEs self-select resources to use.

SUMMARY

The described techniques relate to improved methods, systems, devices, and apparatuses that support techniques for requesting a type of coordination information. Generally, the described techniques provide for a signaling mechanism according to which a first user equipment (UE) may request, from a second UE, a type of coordination information based on an intended sidelink transmission from the first UE. For example, the second UE may be capable of providing various types of coordination information to the first UE and the first UE may request a specific type of coordination information from the various types of coordination information from the various types of coordination information based on information associated with the intended sidelink transmission from the first UE.

In some implementations, for example, the first UE may transmit a request the specific type of coordination information based on a cast type of the intended sidelink transmission, a priority of the intended sidelink transmission, a size of the intended transmission, a modulation and coding scheme (MCS) of the intended transmission, a quality of service (QoS) associated with the intended transmission, a system resource utilization or congestion, or any combination thereof. Additionally or alternatively, the first UE may transmit an indication of the information associated with the intended sidelink transmission to the second UE and the second UE may determine a type of coordination information that may be suitable for the first UE based on the information associated with the intended sidelink transmission. As such, the second UE may generate or otherwise determine coordination information in accordance with the requested or determined type of coordination information and may transmit the coordination information to the first UE. The first UE may use the coordination information to select a set of resources for the intended sidelink transmission and may perform the intended sidelink transmission over the selected set of resources accordingly.

A method for wireless communication at a first UE is described. The method may include transmitting, to a second UE, a request for a type of resource coordination information from a set of types of resource coordination information, receiving, from the second UE, a first message indicating resource coordination information in accordance with the type of resource coordination information, and transmitting a second message over a set of sidelink resources, the set of sidelink resources based on the resource coordination information.

An apparatus for wireless communication at a first UE is described. The apparatus may include a processor, memory coupled with the processor, and instructions stored in the memory. The instructions may be executable by the processor to cause the apparatus to transmit, to a second UE, a request for a type of resource coordination information from a set of types of resource coordination information, receive, from the second UE, a first message indicating resource coordination information in accordance with the type of resource coordination information, and transmit a second message over a set of sidelink resources, the set of sidelink resources based on the resource coordination information.

Another apparatus for wireless communication at a first UE is described. The apparatus may include means for transmitting, to a second UE, a request for a type of resource coordination information from a set of types of resource coordination information, means for receiving, from the second UE, a first message indicating resource coordination information in accordance with the type of resource coordination information, and means for transmitting a second message over a set of sidelink resources, the set of sidelink resources based on the resource coordination information.

A non-transitory computer-readable medium storing code for wireless communication at a first UE is described. The code may include instructions executable by a processor to transmit, to a second UE, a request for a type of resource coordination information from a set of types of resource coordination information, receive, from the second UE, a first message indicating resource coordination information in accordance with the type of resource coordination information, and transmit a second message over a set of sidelink resources, the set of sidelink resources based on the resource coordination information.

Some examples of the method, apparatuses, and non-transitory computer-readable medium described herein may further include operations, features, means, or instructions for identifying a set of available types of resource coordination information from the set of types of resource coordination information, where the type of resource coordination information requested by the first UE may be included by the set of available types of resource coordination information.

In some examples of the method, apparatuses, and non-transitory computer-readable medium described herein, identifying the set of available types of resource coordination information may include operations, features, means, or instructions for receiving an indication of the set of available types of resource coordination information.

In some examples of the method, apparatuses, and non-transitory computer-readable medium described herein, identifying the set of available types of resource coordination information may include operations, features, means, or instructions for reading a memory of the first UE to identify the set of available types of resource coordination information.

In some examples of the method, apparatuses, and non-transitory computer-readable medium described herein, the set of available types of resource coordination information may be based on a resource pool allocated to the first UE.

In some examples of the method, apparatuses, and non-transitory computer-readable medium described herein, transmitting the request for the type of resource coordination information may include operations, features, means, or instructions for requesting the type of resource coordination information from the set of types of resource coordination information based on information associated with the second message.

In some examples of the method, apparatuses, and non-transitory computer-readable medium described herein, the information associated with the second message includes one or more of a cast type associated with the second message, a priority associated with the second message, a size of the second message, a MCS of the second message, a QoS associated with the second message, or a system resource utilization.

Some examples of the method, apparatuses, and non-transitory computer-readable medium described herein may further include operations, features, means, or instructions for transmitting the request for the type of resource coordination information may be based on a satisfaction of a condition, the condition being associated with one or more of a cast type associated with the second message, a priority associated with the second message, a size of the second message, a MCS of the second message, a QoS associated with the second message, or a system resource utilization.

In some examples of the method, apparatuses, and non-transitory computer-readable medium described herein, the request may be transmitted via one or more of second stage sidelink control information (SCI-2), a medium access control (MAC) control element (MAC-CE), or radio resource control (RRC) signaling.

A method for wireless communication at a second UE is described. The method may include receiving, from a first UE, a request for a type of resource coordination information from a set of types of resource coordination information, generating resource coordination information in accordance with the type of resource coordination information, and transmitting, to the first UE, a first message indicating the resource coordination information generated in accordance with the type of resource coordination information.

An apparatus for wireless communication at a second UE is described. The apparatus may include a processor, memory coupled with the processor, and instructions stored in the memory. The instructions may be executable by the processor to cause the apparatus to receive, from a first UE, a request for a type of resource coordination information from a set of types of resource coordination information, generate resource coordination information in accordance with the type of resource coordination information, and transmit, to the first UE, a first message indicating the resource coordination information generated in accordance with the type of resource coordination information.

Another apparatus for wireless communication at a second UE is described. The apparatus may include means for receiving, from a first UE, a request for a type of resource coordination information from a set of types of resource coordination information, means for generating resource coordination information in accordance with the type of resource coordination information, and means for transmitting, to the first UE, a first message indicating the resource coordination information generated in accordance with the type of resource coordination information.

A non-transitory computer-readable medium storing code for wireless communication at a second UE is described. The code may include instructions executable by a processor to receive, from a first UE, a request for a type of resource coordination information from a set of types of resource coordination information, generate resource coordination information in accordance with the type of resource coordination information, and transmit, to the first UE, a first message indicating the resource coordination information generated in accordance with the type of resource coordination information.

Some examples of the method, apparatuses, and non-transitory computer-readable medium described herein may further include operations, features, means, or instructions for identifying a set of available types of resource coordination information from the set of types of resource coordination information, where the type of resource coordination information requested by the first UE may be included by the set of available types of resource coordination information.

In some examples of the method, apparatuses, and non-transitory computer-readable medium described herein, identifying the set of available types of resource coordination information may include operations, features, means, or instructions for receiving an indication of the set of available types of resource coordination information.

In some examples of the method, apparatuses, and non-transitory computer-readable medium described herein, identifying the set of available types of resource coordination information may include operations, features, means, or instructions for reading a memory of the second UE to identify the set of available types of resource coordination information.

Some examples of the method, apparatuses, and non-transitory computer-readable medium described herein may further include operations, features, means, or instructions for transmitting, to the first UE, an indication of the set of available types of resource coordination information.

In some examples of the method, apparatuses, and non-transitory computer-readable medium described herein, the set of available types of resource coordination information may be based on a resource pool allocated to the first UE.

In some examples of the method, apparatuses, and non-transitory computer-readable medium described herein, receiving the request for the type of resource coordination information may include operations, features, means, or instructions for receiving the request for the type of resource coordination information from the set of types of resource coordination information based on information associated with a second message to be transmitted by the first UE.

In some examples of the method, apparatuses, and non-transitory computer-readable medium described herein, the information associated with the second message includes one or more of a cast type associated with the second message, a priority associated with the second message, a size of the second message, a MCS of the second message, a QoS associated with the second message, or a system resource utilization.

In some examples of the method, apparatuses, and non-transitory computer-readable medium described herein, the request may be received via one or more of SCI-2, a MAC-CE, or RRC signaling.

A method for wireless communication at a second UE is described. The method may include receiving, from a first UE, a first message indicating information associated with a transmission from the first UE, determining a type of resource coordination information from a set of types of resource coordination information based on the information associated with the transmission from the first UE, and transmitting, to the first UE, a second message indicating resource coordination information in accordance with the type of resource coordination information.

An apparatus for wireless communication at a second UE is described. The apparatus may include a processor, memory coupled with the processor, and instructions stored in the memory. The instructions may be executable by the processor to cause the apparatus to receive, from a first UE, a first message indicating information associated with a transmission from the first UE, determine a type of resource coordination information from a set of types of resource coordination information based on the information associated with the transmission from the first UE, and transmit, to the first UE, a second message indicating resource coordination information in accordance with the type of resource coordination information.

Another apparatus for wireless communication at a second UE is described. The apparatus may include means for receiving, from a first UE, a first message indicating information associated with a transmission from the first UE, means for determining a type of resource coordination information from a set of types of resource coordination information based on the information associated with the transmission from the first UE, and means for transmitting, to the first UE, a second message indicating resource coordination information in accordance with the type of resource coordination information.

A non-transitory computer-readable medium storing code for wireless communication at a second UE is described. The code may include instructions executable by a processor to receive, from a first UE, a first message indicating information associated with a transmission from the first UE, determine a type of resource coordination information from a set of types of resource coordination information based on the information associated with the transmission from the first UE, and transmit, to the first UE, a second message indicating resource coordination information in accordance with the type of resource coordination information.

Some examples of the method, apparatuses, and non-transitory computer-readable medium described herein may further include operations, features, means, or instructions for transmitting, to the first UE, messaging indicating the type of resource coordination information.

In some examples of the method, apparatuses, and non-transitory computer-readable medium described herein, transmitting the messaging indicating the type of resource coordination information may include operations, features, means, or instructions for transmitting, in the second message, an indication of the type of resource coordination information.

In some examples of the method, apparatuses, and non-transitory computer-readable medium described herein, transmitting the messaging indicating the type of resource coordination information may include operations, features, means, or instructions for indicating the type of resource coordination information based on a type of the second message.

In some examples of the method, apparatuses, and non-transitory computer-readable medium described herein, the type of the second message may be associated with a channel over which the second message may be transmitted.

In some examples of the method, apparatuses, and non-transitory computer-readable medium described herein, transmitting the messaging indicating the type of resource coordination information may include operations, features, means, or instructions for transmitting, to the first UE, a third message including an indication of the type of resource coordination information.

In some examples of the method, apparatuses, and non-transitory computer-readable medium described herein, the third message may be transmitted as part of a connection establishment procedure with the first UE.

In some examples of the method, apparatuses, and non-transitory computer-readable medium described herein, determining the type of resource coordination information from the set of types of resource coordination information may include operations, features, means, or instructions for determining the type of resource coordination information based on one or more of a cast type associated with the transmission from the first UE, a priority associated with the transmission from the first UE, a size of the transmission from the first UE, a MCS of the transmission from the first UE, a QoS associated with the transmission from the first UE, or a system resource utilization.

In some examples of the method, apparatuses, and non-transitory computer-readable medium described herein, the information associated with the transmission from the first UE includes one or more of the cast type associated with the transmission from the first UE, the priority associated with the transmission from the first UE, the size of the transmission from the first UE, the MCS of the transmission from the first UE, the QoS associated with the transmission from the first UE, or the system resource utilization.

BRIEF DESCRIPTION OF THE DRAWINGS

FIGS. 11 through 13 show flowcharts illustrating methods that support techniques for requesting a type of coordination information in accordance with aspects of the present disclosure.

DETAILED DESCRIPTION

Figure 1:
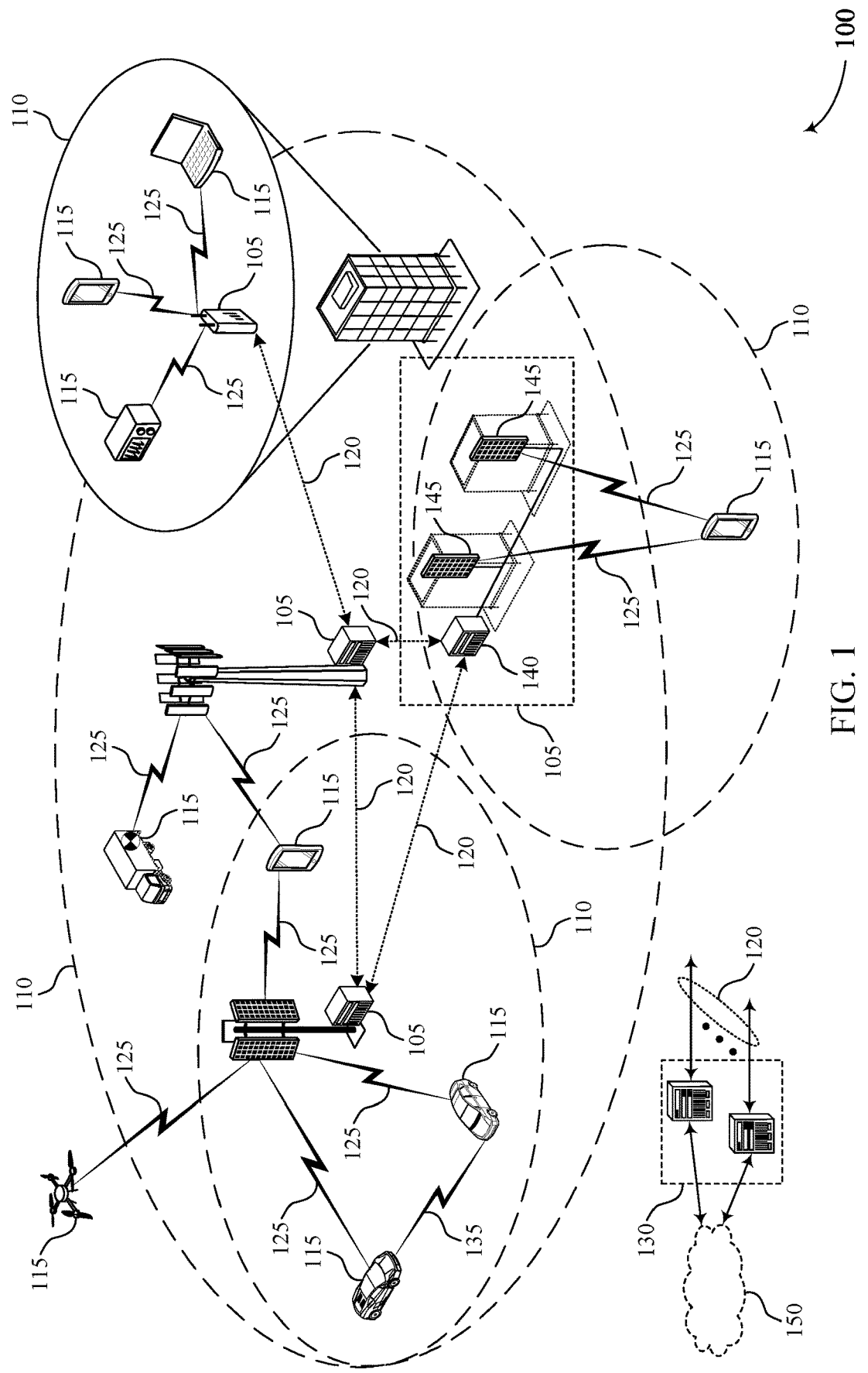
FIGS. 1 and 2 illustrate examples of wireless communications systems that support techniques for requesting a type of coordination information in accordance with aspects of the present disclosure.

In some wireless communications systems, a first user equipment (UE) may communicate with one or more other UEs via one or more sidelinks. In some aspects, the UEs may communicate in accordance with a sidelink resource allocation mode 2 according to which the UEs may select resource for sidelink communication in a distributed manner and the UEs may generate and share coordination information (e.g., resource coordination information or inter-UE coordination information) with each other. For example, the first UE may receive coordination information from a second UE and the first UE may use the coordination information to select resources for a sidelink transmission from the first UE. The second UE may provide various types of coordination information to the first UE, including a first type of coordination information indicating a set of resources that may be suitable for the sidelink transmission from the first UE (e.g., resources preferred for transmissions of the second UE), a second type of coordination information indicating a set of resources that may be unsuitable for the sidelink transmission from the first UE (e.g., resources not preferred for transmissions of the second UE), or a third type of coordination information that indicates a resource conflict (e.g., between the intended sidelink transmission from the first UE and another sidelink transmission from another UE). In some cases, a specific type of coordination information may be more or less suitable for the first UE in light of a condition of the first UE, the system, or based on the intended sidelink transmission from the first UE. In some systems, however, the first UE may lack a signaling mechanism for requesting a specific type of coordination information from the second UE.

In some implementations of the present disclosure, the first UE may transmit, to the second UE, a request for a type of coordination information from a set of available types of coordination information. The second UE may determine coordination information in accordance with the requested type of coordination information and may transmit the coordination information to the first UE. In some aspects, the set of available types of coordination information may be configured at the first UE via signaling from a UE (e.g., such as the second UE) or from a base station or may be pre-configured at the first UE. Further, in some aspects, the configuration signaling or the pre-configuration may indicate different sets of available types of coordination information for different conditions or parameters, such as for different resource allocations or resource pools over which the first UE communicates.

Additionally or alternatively, in some implementations, the first UE may transmit, to the second UE, information associated with the intended sidelink transmission from the first UE and the second UE may determine which type of coordination information to provide to the first UE based on the information associated with the intended transmission from the first UE. For example, the first UE may indicate a cast type of the intended sidelink transmission, a priority of the intended sidelink transmission, a size of the intended sidelink transmission, a modulation and coding scheme (MCS) of the intended sidelink transmission, a quality of service (QoS) associated with the intended sidelink transmission, a system resource utilization or congestion, or any combination thereof, and the second UE may determine a type of coordination information to provide to the first UE based on such information.

Particular implementations of the subject matter described in this disclosure can be implemented to realize one or more of the following potential advantages. For example, the first UE may have more information (e.g., information relating to a size or an MCS, among other examples) about an intended sidelink transmission from the first UE than the second UE (e.g., the UE generating the coordination information) and may thus have greater insight as to what type of coordination information may be relatively more valuable or useful for scheduling and performing the intended sidelink transmission than the second UE. Further, and based on requesting or otherwise receiving coordination information in accordance with a relatively more valuable or useful type of coordination information, the first UE may more effectively schedule and perform the intended sidelink transmission, which may support a higher reliability for the intended sidelink transmission. As a result of achieving higher reliability for sidelink communication, the first UE may also experience or otherwise support higher data rates and fewer retransmission attempts. Higher data rates and fewer retransmission attempts may, in turn, support greater system capacity and greater spectral efficiency, among other benefits Aspects of the disclosure are initially described in the context of wireless communications systems. Additionally, aspects of the disclosure are illustrated by and described with reference to a signaling diagram, a resource reservation diagram, and process flows. Aspects of the disclosure are further illustrated by and described with reference to apparatus diagrams, system diagrams, and flowcharts that relate to techniques for requesting a type of coordination information.

FIG. 1 illustrates an example of a wireless communications system 100 that supports techniques for requesting a type of coordination information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or expected functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, multiple UEs 115 may communicate with each over one or more sidelinks. The multiple UEs 115 may exchange coordination information, such as coordination information associated with resources that may be more or less suitable for one or more sidelink transmissions. As such, the coordination information that one or more UEs 115 may transmit to one or more other UEs 115 may be equivalently referred to herein as interference coordination information, resource coordination information, or inter-UE coordination information. In some examples, a first UE 115 may transmit, to a second UE 115, a request for a type of coordination information from a set of types of coordination information. For example, the first UE 115 may identify, determine, or receive an indication of a set of available types of coordination information and may request any type of coordination information from the set of available types of coordination information. The second UE 115 may receive the request for the type of coordination information and may generate coordination information for the first UE 115 in accordance with the requested type of coordination information. The first UE 115 may select a set of resources over which to perform a sidelink transmission using the coordination information.

Additionally or alternatively, the first UE 115 may transmit, to the second UE 115, information associated with an intended sidelink transmission from the first UE 115. The second UE 115 may receive the information associated with the intended sidelink transmission and may determine a type of coordination information from a set of types of coordination information (e.g., from a set of available types of coordination information) based on the information associated with the intended sidelink transmission from the first UE 115. The second UE 115 may generate coordination information in accordance with the determined type of coordination information and may transmit the generated coordination information to the first UE 115. As such, the first UE 115 may receive coordination information in accordance with a type of coordination information that is specifically selected based on the information associated with the intended sidelink transmission from the first UE 115 and may select a set of resources over which to perform the intended sidelink transmission using the coordination information.

Figure 2:
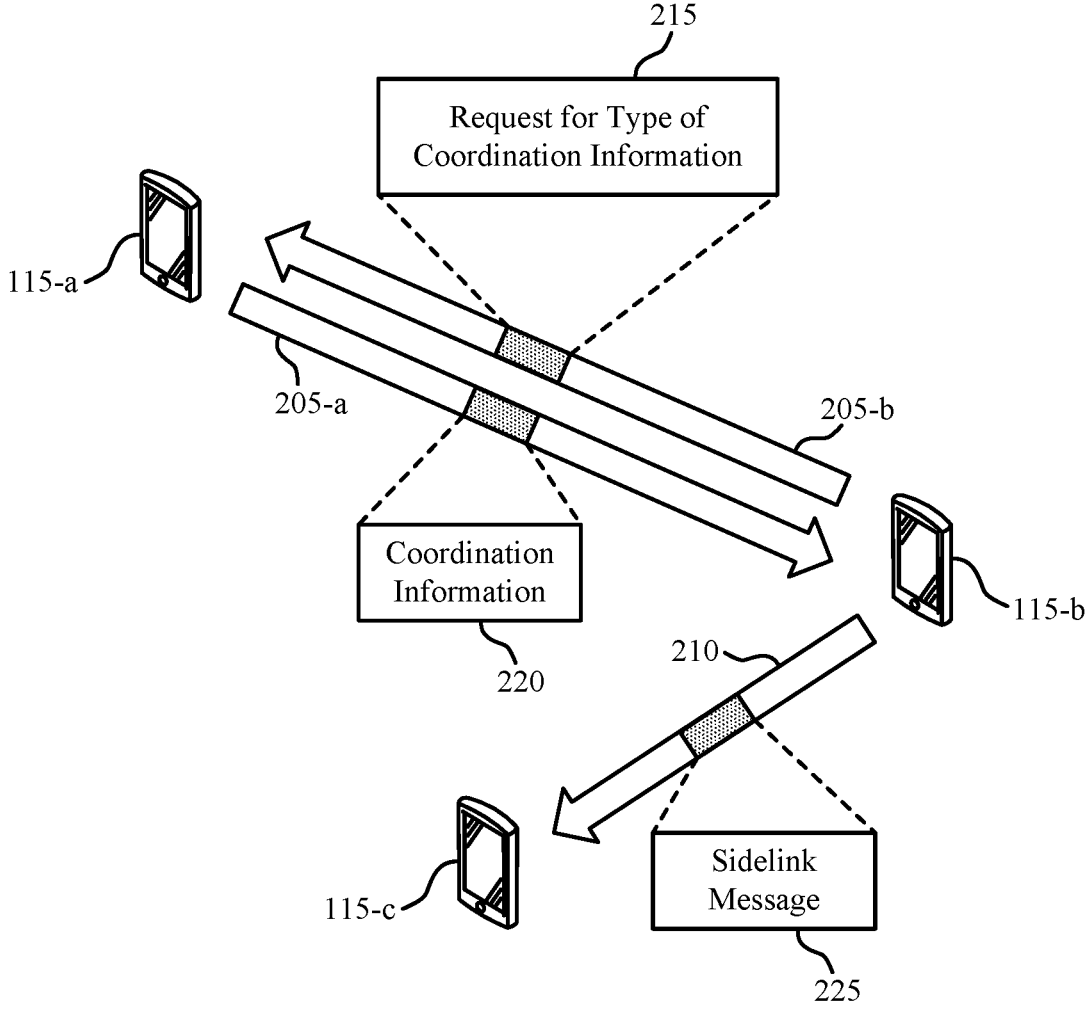

FIG. 2 illustrates an example of a wireless communications system 200 that supports techniques for requesting a type of coordination information in accordance with aspects of the present disclosure. The wireless communications system 200, which may be an example of an NR sidelink system, may implement or be implemented to realize aspects of the wireless communications system 100. For example, the wireless communications system 200 may include a number of UEs 115, which may be examples of corresponding devices described herein, including with reference to FIG. 1. A UE 115-*a* may generate coordination information 220 for one or more other UEs 115 and, in some implementations, a UE 115-*b* may transmit a request 215 for a type of coordination information based on an intended sidelink message 225 from the UE 115-*b* to a UE 115-*c*.

The UE 115-*a* and the UE 115-*b* may communicate via a sidelink 205, including a sidelink 205-*a* (e.g., a forward link) and a sidelink 205-*b* (e.g., a reverse link) and the UE 115-*b* and the UE 115-*c* may communicate via a sidelink 210. In some aspects, the UEs 115 in the wireless communications system 200 may communicate in accordance with a sidelink resource allocation mode in which resource allocation is reservation-based. For example, the UEs 115 may communicate in accordance with a sidelink resource allocation mode 2 according to which the UEs 115 may self-select resources for sidelink communication in a distributed manner. Additional details relating to such reservation-based resource allocation are described herein, including with reference to FIG. 4.

In some aspects, the UE 115-*a* may generate and share coordination information 220 with the UE 115-*b*. Further, although FIG. 2 shows the UE 115-*a* providing coordination information 220 to the UE 115-*b*, the UE 115-*a* may additionally transmit or otherwise share coordination information 220 with one or more other UEs 115. Similarly, although FIG. 2 shows the UE 115-*b* receiving coordination information 220 form the UE 115-*a*, the UE 115-*b* may additionally receive coordination information 220 from one or more other UEs 115. The UE 115-*b* may use the coordination information 220 to select resources for transmissions from the UE 115-*b*, such as to select resources for the sidelink message 225. For example, the coordination information 220 may indicate or otherwise convey information associated with resources over which the UE 115-*b* may potentially use for sidelink transmissions from the UE 115-*b* and the UE 115-*b* may use such information to select suitable resources for the sidelink transmissions from the UE 115-*b*.

The UE 115-*a* may generate the coordination information 220 in accordance with one or more of various types of coordination schemes (e.g., inter-UE coordination schemes). For example, the UE 115-*a* may generate the coordination information 220 in accordance with a first type or scheme that indicates resources that may be suitable or provide for a relatively greater signal quality for transmissions from the UE 115-*b*. Additionally or alternatively, the UE 115-*a* may generate the coordination information 220 in accordance with a second type or scheme that indicates resources that may not be suitable or provide a relatively worse signal quality for transmissions from the UE 115-*b*. Additionally or alternatively, the UE 115-*a* may generate the coordination information 220 in accordance with a third type or scheme that indicates a resource conflict (e.g., a future resource conflict, such as a conflict between resources for in an intended transmission from the UE 115-*a* and resources for one or more other sidelink transmissions from one or more other UEs 115).

In some systems, the UE 115-*b* may receive coordination information 220 from the UE 115-*a* in accordance with any type selected by the UE 115-*a* and the UE 115-*b* may lack a signaling mechanism for indicating any relatively more or less suitable types of coordination information 220 to the UE 115-*a*. For example, the UE 115-*b* (e.g., the UE 115 receiving the coordination information 220) may have relatively more information about transmissions from the UE 115-*b* (e.g., size of the transmissions, an MCS of the transmissions, a QoS of the transmissions, a service type of the transmissions, a cast type of the transmissions, a priority of the transmissions, or a system resource utilization level or congestion level that may influence the transmissions) than the UE 115-*a* (e.g., the UE 115 generating the coordination information 220) and such information about the transmissions from the UE 115-*b* may influence, define, or otherwise be associated with which types of coordination information 220 are more or less useful for the UE 115-*b*. In such systems in which the UE 115-*b* lacks a signaling mechanism for requesting a type of coordination information or in which the UE 115-*a* lacks a behavioral mechanism for selecting a type of coordination information that is (at least likely) to be relatively more useful for the UE 115-*b*, the UE 115-*b* may receive coordination information 220 in accordance with any type, resulting in the possibility of receiving types that are relatively less useful for the UE 115-*b*.

Accordingly, in some implementations, the UE 115-*a* and the UE 115-*b* may support and employ a signaling mechanism according to which the UE 115-*b* is able to indicate a type of coordination information 220 that the UE 115-*b* would like to receive. For example, in some implementations, the UE 115-*b* may transmit a request 215 (e.g., an explicit request) for a type of coordination information 220 to the UE 115-*a*. The UE 115-*b* may transmit the request 215 via various signaling types, including via sidelink control information (SCI), via a MAC control element (MAC-CE), or via RRC signaling (e.g., PC5 RRC), or via any combination thereof. In examples in which the UE 115-*b* transmits the request 215 via SCI, the UE 115-*b* may transmit the request 215 via either first stage SCI, which may be referred to herein as SCI-1, or second stage SCI, which may be referred to herein as SCI-2. The UE 115-*b* may transmit the request 215 via a number of bits, where different permutations of the quantity of bits (e.g., two bits) may correspond or map to different types of coordination information 220.

The UE 115-*b* may transmit the request 215 for a specific type of coordination information 220 from a set of types of coordination information 220. In some examples, the set of types of coordination information 220 may include or refer to a set of available types of coordination information 220. The UE 115-*b* may receive an indication of the set of available types of coordination information 220 (e.g., a set of allowed schemes for interference coordination information 220) via configuration signaling, such as RRC signaling. Additionally or alternatively, the set of available types of coordination information 220 may be pre-configured at the UE 115-*b* (e.g., the UE 115-*b* may be equipped or pre-loaded with the set of available types in a memory of the UE 115-*b*).

In some implementations, the set of available types of coordination information 220 may vary depending on a resource allocation for the UE 115-*b*, a deployment scenario of the UE 115-*b*, a service type associated with the UE 115-*b*, a condition of the UE 115-*b*, a channel quality measured by the UE 115-*b*, or any combination thereof. In some examples, for instance, the set of available types of coordination information 220 may be configured or pre-configured at the UE 115-*b* per resource pool. In such examples, the UE 115-*b* may request from a first set of available types of coordination information 220 if communicating using at least some resources from a first resource pool and may request from a second set of available types of coordination information 220 if communicating using at least some resources from a second resource pool. In some scenarios, the set of available types of coordination information 220 may be equal to one and, if the UE 115-*b* detects that the set of available types of coordination information 220 is equal to one, the UE 115-*b* may determine to refrain from transmitting the request 215.

The UE 115-*b* may request a specific type of coordination information 220 from the UE 115-*a* in accordance with some information associated with an intended transmission from the UE 115-*b* (e.g., in accordance with some information associated with the sidelink message 225). In other words, a type or scheme of coordination information 220 that the UE 115-*b* may request may be influenced, guided, constrained, or limited by such information associated with the intended transmission from the UE 115-*b*. For example, the UE 115-*b* may transmit the request 215 for a specific type of coordination information 220 based on a cast type of the sidelink message 225, a transmission priority associated with the sidelink message 225, a size of the sidelink message 225, an MCS of the sidelink message 225, a QoS of the sidelink message 225, a service type associated with the sidelink message 225, a system resource utilization or congestion, or any combination thereof.

In examples in which the UE 115-*b* request a specific type of coordination information 220 based on cast type, the UE 115-*b* may, in some implementations, request the specific type of coordination information 220 based on a configured rule indicating a mapping between cast types and available types of coordination information 220 from which the UE 115-*b* may select. As an example, the UE 115-*b* may request (e.g., may be constrained to request, such as by a configured rule) a type of coordination information 220 indicating suitable or preferred resources if the UE 115-*b* uses unicast. Further, as another example, the UE 115-*b* may request (e.g., may be constrained to request, such as by a configured rule) a type of coordination information 220 indicating not suitable or not preferred resources or type of coordination information 220 indicating a resource conflict if the UE 115-*b* uses groupcast or broadcast.

In examples in which the UE 115-*b* requests a specific type of coordination information 220 based on the transmission priority associated with the sidelink message 225, the UE 115-*b* may select or determine the specific type of coordination information 220 based on comparing the transmission priority associated with the sidelink message 225 to one or more thresholds (e.g., one or more configurable thresholds). For example, the UE 115-*b* may request a type from a first set of types of coordination information 220 if the transmission priority associated with the sidelink message 225 is below a threshold and may request a type from a second set of types of coordination information 220 if the transmission priority associated with the sidelink message 225 exceeds (or meets) the threshold.

Additionally or alternatively, different types of coordination information 220 may each be associated with different thresholds. For example, a first type of coordination information 220 may be associated with a first threshold, a second type of coordination information 220 may be associated with a second threshold, and a third type of coordination information 220 may be associated with a third threshold. In such examples, the UE 115-*b* may request a type of coordination information 220 associated with a highest threshold satisfied by the transmission priority of the sidelink message 225 or may request any type of coordination information 220 associated with a threshold satisfied by the transmission priority of the sidelink message 225.

In examples in which the UE 115-*b* requests a specific type of coordination information 220 based on the system resource utilization or congestion, the UE 115-*b* may select or determine the specific type of coordination information 220 based on comparing a parameter associated with utilization or congestion, such as a channel busy ratio (CBR), to one or more thresholds (e.g., one or more configurable thresholds). For example, the UE 115-*b* may request a type from a first set of types of coordination information 220 if a CBR is below a threshold and may request a type from a second set of types of coordination information 220 if the CBR exceeds (or meets) the threshold.

Additionally or alternatively, different types of coordination information 220 may each be associated with different thresholds. For example, a first type of coordination information 220 may be associated with a first threshold, a second type of coordination information 220 may be associated with a second threshold, and a third type of coordination information 220 may be associated with a third threshold. In such examples, the UE 115-*b* may request a type of coordination information 220 associated with a highest threshold satisfied by the CBR or may request any type of coordination information 220 associated with a threshold satisfied by the CBR.

As an example, the UE 115-*b* may refrain from requesting a specific type of coordination information 220 if system congestion is relatively high (e.g., above a threshold). Additionally or alternatively, the UE 115-*b* may be able to request from a first set of available types of coordination information 220 if the system congestion is moderately high (e.g., between two thresholds or above one threshold) and may be able to request from a second set of available types of coordination information 220 if the system congestion is relatively low. In some aspects, the UE 115-*b* may determine whether to request a specific type of coordination information 220 based on a tradeoff between current system congestion (and a contribution toward added system congestion associated with transmitting the request 215) and benefits at the UE 115-*b* associated with a specific type of coordination information 220. In other words, the tradeoff may weigh added system congestion with potentially lower likelihoods for resource collisions or retransmissions.

In addition or as an alternative to transmitting the request 215 for a specific type of coordination information 220, the UE 115-*b* may transmit information associated with the sidelink message 225 to the UE 115-*a* and the UE 115-*a* may determine a type of coordination information for the UE 115-*b* based on the information associated with the sidelink message 225. For example, the UE 115-*a* may transmit a coordination message to the UE 115-*b* including coordination information 220 using a type or scheme determined according to an intended transmission cast type from the UE 115-*b* (e.g., the cast type that the UE 115-*b* may use for the sidelink message 225), an intended transmission priority (e.g., the priority of the sidelink message 225), a size of an intended transmission (e.g., a size of the sidelink message 225), an MCS of an intended transmission (e.g., an MCS of the sidelink message 225), a QoS or a service type associated with an intended transmission (e.g., a QoS or service type associated with the sidelink message 225) a system resource utilization or congestion, or any combination thereof.

In examples in which the UE 115-*a* selects or determines a type of coordination information 220 for the UE 115-*b* based on a cast type of the sidelink message 225, the UE 115-*b* may transmit an explicit indication of the cast type to be used for the sidelink message 225 to the UE 115-*a* or the UE 115-*a* may implicitly determine the cast type to be used for the sidelink message 225. In examples in which the UE 115-*a* implicitly determines the cast type, if coordination signaling between the UE 115-*a* and the UE 115-*b* is sent on a unicast link, the UE 115-*a* may implicitly determine that the UE 115-*b* also uses unicast for the sidelink message 225. As an example, if the UE 115-*a* receives an indication or implicitly determines that the UE 115-*b* uses unicast for the sidelink message 225, the UE 115-*a* may determine to provide a type of coordination information 220 that indicates potentially suitable resources for the sidelink message 225. The UE 115-*a* may alternatively determine that the UE 115-*b* uses groupcast or broadcast for the sidelink message 225 and, in such examples, may select or determine to use a different type of coordination information 220.

Additionally or alternatively, the UE 115-*a* may indicate multiple different types of coordination information 220 (e.g., suitable resources and not suitable resources) and may indicate or configure the UE 115-*b* to use one of the multiple different types of coordination information 220 based on a cast type of the UE 115-*b*. For example, the UE 115-*a* may indicate two types of coordination information 220 and the UE 115-*b* may use a first type if the UE 115-*b* uses unicast for the sidelink message 225 or may use a second type if the UE 115-*b* uses a cast type other than unicast for the sidelink message 225. As such, even if the UE 115-*b* does not provide an indication of the cast type it uses for the sidelink message 225 to the UE 115-*a*, the UE 115-*a* may nonetheless provide relatively more useful coordination information 220 based on such an indication of multiple types of coordination information 220. Further, the UE 115-*a* may similarly indicate multiple types of coordination information 220 to the UE 115-*b* and the UE 115-*b* may select to use one or more of the multiple types of coordination information 220 based on any information associated with the sidelink message 225.

In examples in which the UE 115-*a* selects or determines a type of coordination information 220 based on a priority of the sidelink message 225, the UE 115-*a* may compare the priority of the sidelink message 225 to one or more thresholds (e.g., one or more configurable thresholds) to determine which type of coordination information 220 to generate for the UE 115-*b*. Further, in some implementations, the UE 115-*a* may indicate an applicable priority in the coordination information 220 that the UE 115-*a* sends to the UE 115-*b*. Further, in examples in which the UE 115-*a* selects or determines a type of coordination information 220 based on a system resource utilization or congestion, the UE 115-*a* may compare a metric, such as a CBR, to one or more thresholds (e.g., one or more configurable thresholds) to determine which type of coordination information 220 to generate for the UE 115-*b*.

As such, the UE 115-*a* may generate coordination information 220 for the UE 115-*b* in accordance with a type or scheme that is relatively more useful for the UE 115-*b* based on information associated with an intended transmission from the UE 115-*b*. The UE 115-*a* may transmit the coordination information 220 to the UE 115-*b* and, in some examples, may indicate the type of coordination information 220 that the UE 115-*a* generated for the UE 115-*b* in various ways. In some implementations, the UE 115-*a* may include an indication (e.g., an explicit indication) of the type of coordination information 220 generated by the UE 115-*a* in the message carrying the coordination information 220. Additionally or alternatively, the UE 115-*a* may implicitly indicate the type of coordination information 220 generated by the UE 115-*a* based on a type of the message carrying the coordination information 220. For example, if the UE 115-*a* transmits the coordination information 220 via a physical sidelink feedback channel (PSFCH) instead of some other channel, the UE 115-*b* may implicitly determine that the type of coordination information 220 indicates a resource conflict (e.g., as a result of the PSFCH including a single bit for the coordination information 220).

Additionally or alternatively, the UE 115-*a* may indicate the type of coordination information 220 generated by the UE 115-*a* in a separate message. For example, the UE 115-*a* may indicate the type of coordination information 220 via an RRC message. In such examples, the UE 115-*a* may indicate the type of coordination information 220 during an initial access or connection establishment procedure and, in some implementations, responsive to receiving the request 215 via another RRC message.

Accordingly, the UE 115-*b* may use the coordination information 220 to select a set of resources over which the UE 115-*b* may transmit the sidelink message 225. In some examples, and as shown in FIG. 2, the UE 115-*b* may transmit the sidelink message 225 to the UE 115-*c*. Further, although the UE 115-*b* is shown as transmitting the sidelink message 225 to the UE 115-*c*, the UE 115-*b* may transmit the sidelink message 225 to any one or more UEs 115, including the UE 115-*a*.

Figure 3:
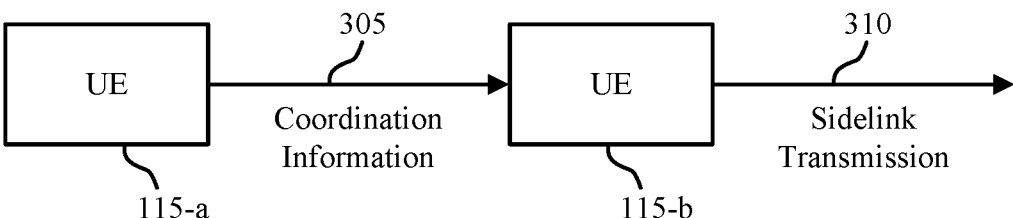
FIG. 3 illustrates an example of a signaling diagram that supports techniques for requesting a type of coordination information in accordance with aspects of the present disclosure.

FIG. 3 illustrates an example of a signaling diagram 300 that supports techniques for requesting a type of coordination information in accordance with aspects of the present disclosure. The signaling diagram 300 may implement or be implemented to realize aspects of the wireless communications system 100 or the wireless communications system 200. For example, the signaling diagram 300 illustrates communication between a UE 115-*a* and a UE 115-*b*, which may be examples of corresponding devices described herein, including with reference to FIGS. 1 and 2.

The UE 115-*a* may transmit coordination information 305 to the UE 115-*b* and the UE 115-*b* may use the coordination information 305 to select resources over which to perform a sidelink transmission 310. In some implementations, the UE 115-*b* may indicate a type of coordination information 305 to the UE 115-*a* and the UE 115-*a* may provide coordination information 305 in accordance with the type indicated by the UE 115-*b*. In some examples, the UE 115-*b* may indicate the type of coordination information 305 via an explicit request for the type of coordination information 305. In some other examples, the UE 115-*b* may indicate the type of coordination information 305 implicitly via information associated with the sidelink transmission 310 and the UE 115-*a* may select or determine the type of coordination information 305 based on the information associated with the sidelink transmission 310.

Figure 4:
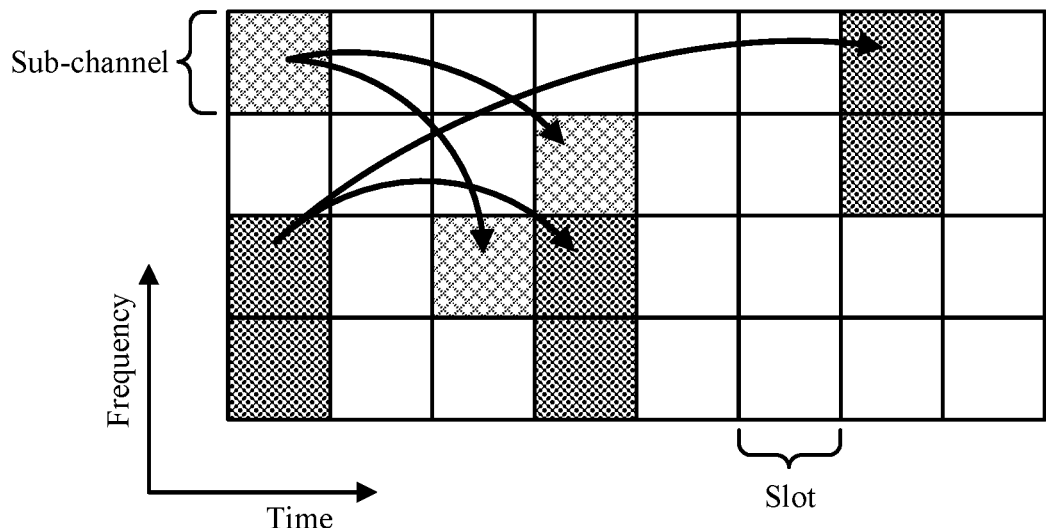
FIG. 4 illustrates an example of a resource reservation diagram that supports techniques for requesting a type of coordination information in accordance with aspects of the present disclosure.
Figure 4:
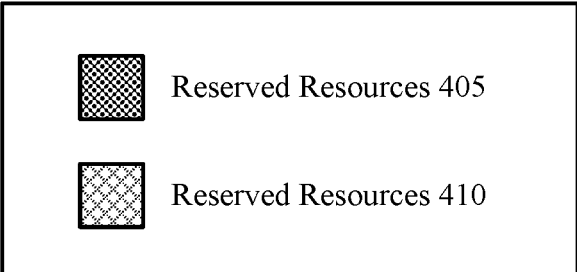

FIG. 4 illustrates an example of a resource reservation diagram 400 that supports techniques for requesting a type of coordination information in accordance with aspects of the present disclosure. The resource reservation diagram 400 may implement or be implemented to realize aspects of the wireless communications system 100, the wireless communications system 200, or the signaling diagram 300. For example, the resource reservation diagram 400 may illustrate reservation-based resource allocation in an NR sidelink communications system. In some aspects, and as shown in FIG. 4, resource allocations may be in units of sub-channels in the frequency domain and may be constrained or limited to one slot in the time domain.

In some examples, a sidelink transmission may reserve resources in a current slot and in up to two future slots. For example, a UE 115 may transmit a sidelink message in a first slot, and the sidelink message may include reservation information reserving resources in up to two future slots. As shown in FIG. 4, for instance, a first sidelink message may include reservation information indicating reserved resources 405 and a second sidelink message may include reservation information indicating reserved resources 410. In some aspects, reservation information may be carried in SCI, such as one or both of SCI-1 or SCI-2. Further, in some examples, NR sidelink systems may support both aperiodic and periodic resource reservations. For example, a UE 115 may signal a period, with configurable values between 0 milliseconds and 1000 milliseconds, in SCI. In some examples, periodic resource reservation and signaling may be disabled by configuration or pre-configuration.

Figure 5:
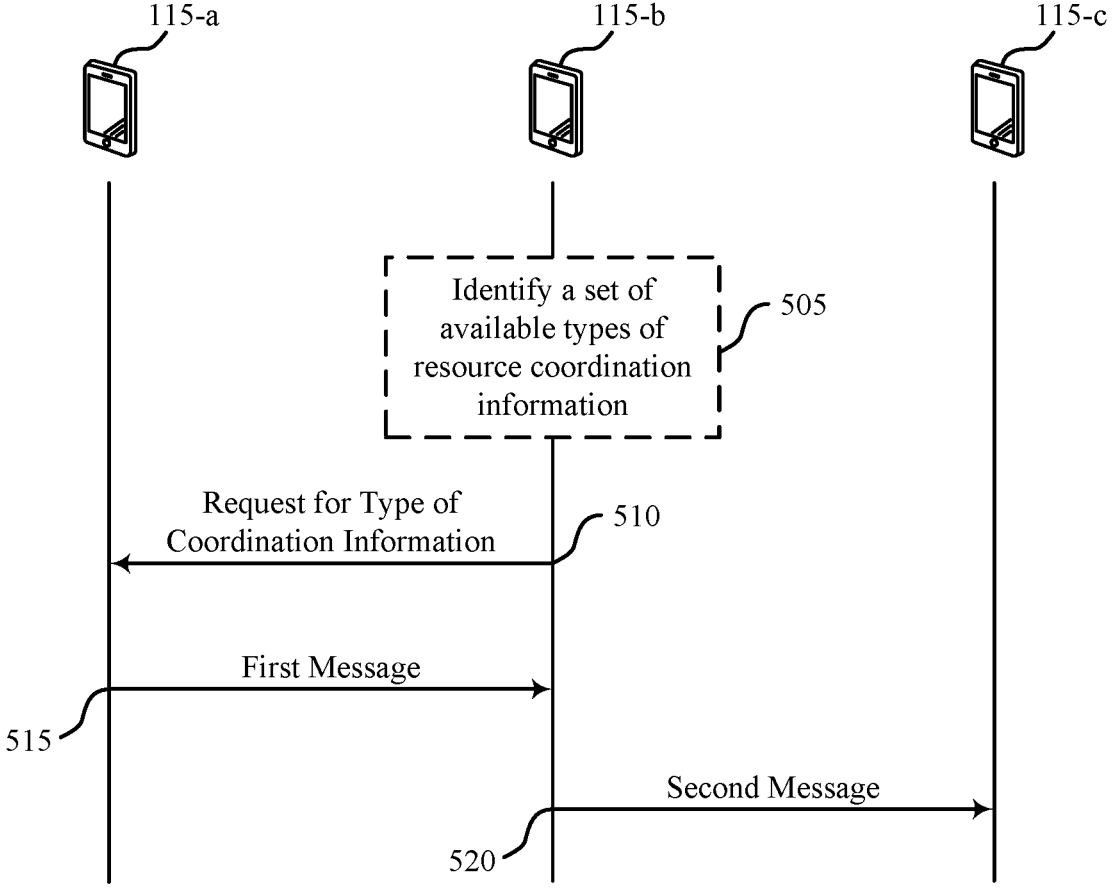
FIGS. 5 and 6 illustrate examples of process flows that support techniques for requesting a type of coordination information in accordance with aspects of the present disclosure.

FIG. 5 illustrates an example of a process flow 500 that supports techniques for requesting a type of coordination information in accordance with aspects of the present disclosure. The process flow 500 may implement or be implemented to realize aspects of the wireless communications system 100 or the wireless communications system 200. For example, the process flow 500 illustrates communication between a UE 115-*a*, a UE 115-*b*, and a UE 115-*c*, which may be examples of corresponding devices described herein, including with reference to FIGS. 1 through 4. In some implementations, the UE 115-*b* may request a specific type of coordination information from the UE 115-*a* based on a message to be sent from the UE 115-*b*.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 505, the UE 115-*b* may identify a set of available types of coordination information (e.g., inter-UE coordination information or resource coordination information) from a larger set of types of coordination information. In some examples, the UE 115-*b* may receive an indication of the set of available types of coordination information from another device (e.g., such as another UE 115 or a base station 105). Additionally or alternatively, the UE 115-*b* may read a memory of the UE 115-*b* to identify the set of available types of coordination information. For example, the UE 115-*b* may be pre-configured, pre-loaded, or equipped with the set of available types of coordination information and the UE 115-*b* may access the set of available types of coordination information via a memory of the UE 115-*b*. In some aspects, the set of available types of coordination information may be based on a resource pool allocated to the UE 115-*b* or usable by the UE 115-*b*.

At 510, the UE 115-*b* may transmit, to the UE 115-*a*, a request for a type of coordination information from the set of (available) types of coordination information. In some implementations, the UE 115-*b* may request a specific type of coordination information based on a cast type of an intended transmission from the UE 115-*b*, a priority of the intended transmission from the UE 115-*b*, a size of the intended transmission from the UE 115-*b*, an MCS of the intended transmission from the UE 115-*b*, a QoS associated with the intended transmission, a system resource utilization or congestion, or any combination thereof. In some aspects, the UE 115-*b* may transmit the request via one or more of SCI-2, a MAC-CE, or RRC signaling.

At 515, the UE 115-*b* may receive, from the UE 115-*a*, a first message indicating coordination information in accordance with the type of coordination information requested by the UE 115-*b*.

At 520, the UE 115-*b* may transmit a second message over a set of sidelink resources, the set of sidelink resources based on (e.g., selected in accordance with) the coordination information received from the UE 115-*a* at 515. In some examples, the UE 115-*b* may transmit the second message to one or more UEs 115 including the UE 115-*c*.

Figure 6:
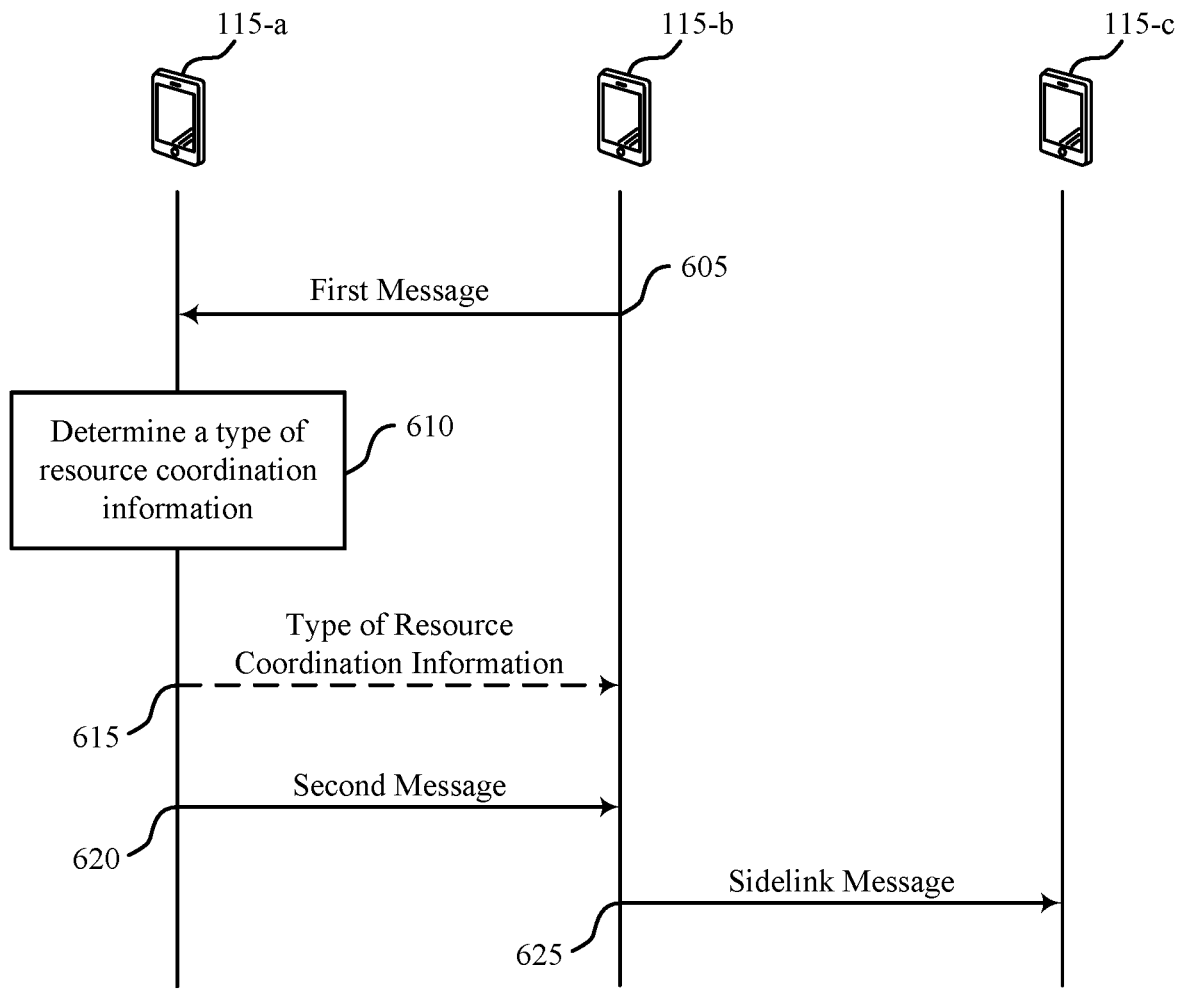

FIG. 6 illustrates an example of a process flow 600 that supports techniques for requesting a type of coordination information in accordance with aspects of the present disclosure. The process flow 600 may implement or be implemented to realize aspects of the wireless communications system 100 or the wireless communications system 200. For example, the process flow 600 illustrates communication between a UE 115-*a*, a UE 115-*b*, and a UE 115-*c*, which may be examples of corresponding devices described herein, including with reference to FIGS. 1 through 5. In some implementations, the UE 115-*a* may determine a type of coordination information to generate for the UE 115-*b* based on information associated with an intended transmission from the UE 115-*b*.

In the following description of the process flow 600, the operations may be performed (such as reported or provided) in a different order than the order shown, or the operations performed by the example devices may be performed in different orders or at different times. Some operations also may be left out of the process flow 600, or other operations may be added to the process flow 600. Further, although some operations or signaling may be shown to occur at different times for discussion purposes, these operations may actually occur at the same time.

At 605, the UE 115-*a* may receive, from the UE 115-*b*, a first message indicating information associated with a transmission from the UE 115-*b*. In some implementations, the first message may indicate a cast type of the intended transmission from the UE 115-*b*, a priority of the intended transmission from the UE 115-*b*, a size of the intended transmission from the UE 115-*b*, an MCS of the intended transmission from the UE 115-*b*, a QoS associated with the intended transmission, a system resource utilization or congestion, or any combination thereof.

At 610, the UE 115-*a* may determine a type of coordination information from a set of (available) types of coordination information based on the information associated with the transmission from the UE 115-*b*. For example, the UE 115-*a* may select or otherwise determine the type of coordination information based on the cast type of the intended transmission from the UE 115-*b*, the priority of the intended transmission from the UE 115-*b*, the size of the intended transmission from the UE 115-*b*, the MCS of the intended transmission from the UE 115-*b*, the QoS associated with the intended transmission, the system resource utilization or congestion, or any combination thereof.

At 615, the UE 115-*a* may transmit, to the UE 115-*b*, messaging indicating the type of resource coordination information determined at 610. The UE 115-*a* may indicate the type of resource coordination information based on including an indication in a message also carrying the coordination information, via a type of channel over which the message carrying the coordination information is transmitted, or via a separate message (e.g., an RRC message).

At 620, the UE 115-*a* may transmit, to the UE 115-*b*, a second message indicating resource coordination information in accordance with the type of resource coordination information determined at 610 and, in some implementations, the type indicated at 615.

At 625, the UE 115-*a* may transmit a sidelink message over a set of sidelink resources, the set of sidelink resources based on (e.g., selected in accordance with) the coordination information received from the UE 115-*a* at 620. In some examples, the UE 115-*b* may transmit the sidelink message to one or more UEs 115 including the UE 115-*c*.

Figure 7:
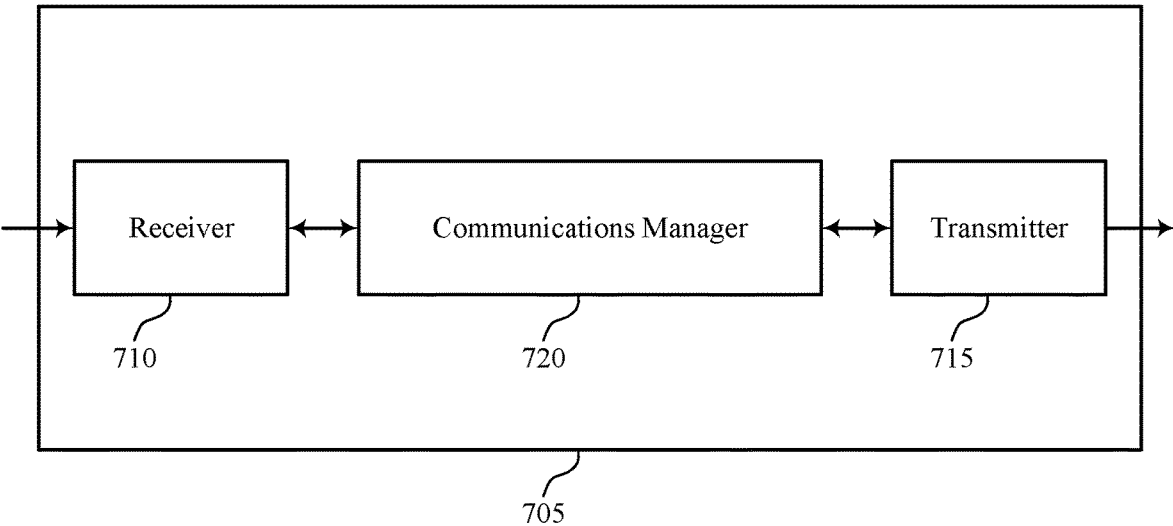
FIGS. 7 and 8 show block diagrams of devices that support techniques for requesting a type of coordination information in accordance with aspects of the present disclosure.

FIG. 7 shows a block diagram 700 of a device 705 that supports techniques for requesting a type of coordination information in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for requesting a type of coordination information). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for requesting a type of coordination information). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for requesting a type of coordination information as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for transmitting, to a second UE, a request for a type of resource coordination information from a set of types of resource coordination information. The communications manager 720 may be configured as or otherwise support a means for receiving, from the second UE, a first message indicating resource coordination information in accordance with the type of resource coordination information. The communications manager 720 may be configured as or otherwise support a means for transmitting a second message over a set of sidelink resources, the set of sidelink resources based on the resource coordination information.

Additionally or alternatively, the communications manager 720 may support wireless communication at a second UE in accordance with examples as disclosed herein. For example, the communications manager 720 may be configured as or otherwise support a means for receiving, from a first UE, a request for a type of resource coordination information from a set of types of resource coordination information. The communications manager 720 may be configured as or otherwise support a means for generating resource coordination information in accordance with the type of resource coordination information. The communications manager 720 may be configured as or otherwise support a means for transmitting, to the first UE, a first message indicating the resource coordination information generated in accordance with the type of resource coordination information.

Additionally or alternatively, the communications manager 720 may support wireless communication at a second UE in accordance with examples as disclosed herein. For example, the communications manager 720 may be configured as or otherwise support a means for receiving, from a first UE, a first message indicating information associated with a transmission from the first UE. The communications manager 720 may be configured as or otherwise support a means for determining a type of resource coordination information from a set of types of resource coordination information based on the information associated with the transmission from the first UE. The communications manager 720 may be configured as or otherwise support a means for transmitting, to the first UE, a second message indicating resource coordination information in accordance with the type of resource coordination information.

By including or configuring the communications manager 720 in accordance with examples as described herein, the device 705 (e.g., a processor controlling or otherwise coupled to or coupled with the receiver 710, the transmitter 715, the communications manager 720, or a combination thereof) may support techniques for reduced processing, reduced power consumption, and more efficient utilization of communication resources.

Figure 8:
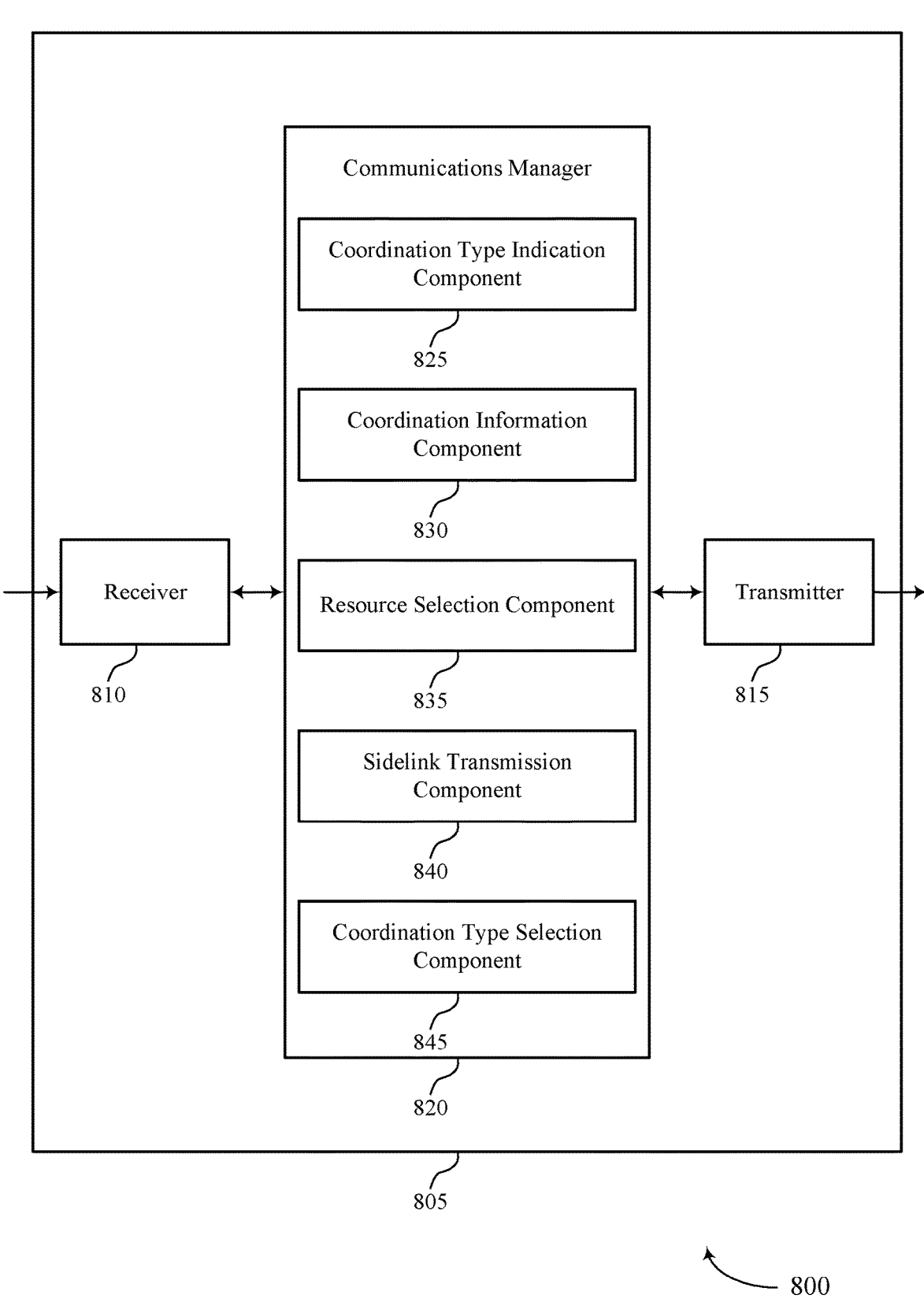

FIG. 8 shows a block diagram 800 of a device 805 that supports techniques for requesting a type of coordination information in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for requesting a type of coordination information). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for requesting a type of coordination information). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for requesting a type of coordination information as described herein. For example, the communications manager 820 may include a coordination type indication component 825, a coordination information component 830, a resource selection component 835, a sidelink transmission component 840, a coordination type selection component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The coordination type indication component 825 may be configured as or otherwise support a means for transmitting, to a second UE, a request for a type of resource coordination information from a set of types of resource coordination information. The coordination information component 830 may be configured as or otherwise support a means for receiving, from the second UE, a first message indicating resource coordination information in accordance with the type of resource coordination information. The resource selection component 835 may be configured as or otherwise support a means for transmitting a second message over a set of sidelink resources, the set of sidelink resources based on the resource coordination information.

Additionally or alternatively, the communications manager 820 may support wireless communication at a second UE in accordance with examples as disclosed herein. The coordination type indication component 825 may be configured as or otherwise support a means for receiving, from a first UE, a request for a type of resource coordination information from a set of types of resource coordination information. The coordination information component 830 may be configured as or otherwise support a means for generating resource coordination information in accordance with the type of resource coordination information. The coordination information component 830 may be configured as or otherwise support a means for transmitting, to the first UE, a first message indicating the resource coordination information generated in accordance with the type of resource coordination information.

Additionally or alternatively, the communications manager 820 may support wireless communication at a second UE in accordance with examples as disclosed herein. The sidelink transmission component 840 may be configured as or otherwise support a means for receiving, from a first UE, a first message indicating information associated with a transmission from the first UE. The coordination type selection component 845 may be configured as or otherwise support a means for determining a type of resource coordination information from a set of types of resource coordination information based on the information associated with the transmission from the first UE. The coordination information component 830 may be configured as or otherwise support a means for transmitting, to the first UE, a second message indicating resource coordination information in accordance with the type of resource coordination information.

Figure 9:
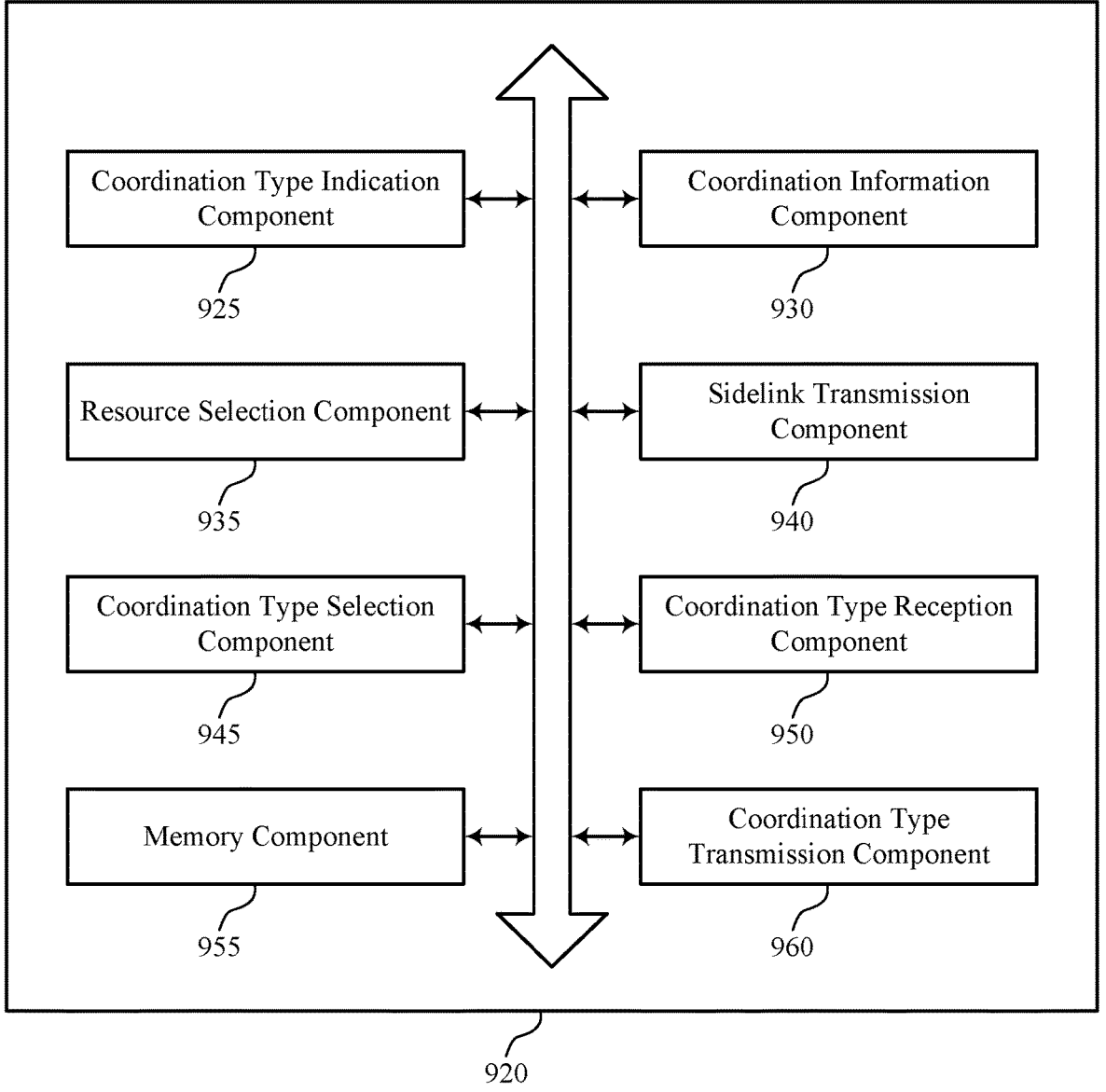
FIG. 9 shows a block diagram of a communications manager that supports techniques for requesting a type of coordination information in accordance with aspects of the present disclosure.

FIG. 9 shows a block diagram 900 of a communications manager 920 that supports techniques for requesting a type of coordination information in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for requesting a type of coordination information as described herein. For example, the communications manager 920 may include a coordination type indication component 925, a coordination information component 930, a resource selection component 935, a sidelink transmission component 940, a coordination type selection component 945, a coordination type reception component 950, a memory component 955, a coordination type transmission component 960, or any combination thereof. Each of these components may communicate, directly or indirectly, with one another (e.g., via one or more buses).

The communications manager 920 may support wireless communication at a first UE in accordance with examples as disclosed herein. The coordination type indication component 925 may be configured as or otherwise support a means for transmitting, to a second UE, a request for a type of resource coordination information from a set of types of resource coordination information. The coordination information component 930 may be configured as or otherwise support a means for receiving, from the second UE, a first message indicating resource coordination information in accordance with the type of resource coordination information. The resource selection component 935 may be configured as or otherwise support a means for transmitting a second message over a set of sidelink resources, the set of sidelink resources based on the resource coordination information.

In some examples, the coordination type selection component 945 may be configured as or otherwise support a means for identifying a set of available types of resource coordination information from the set of types of resource coordination information, where the type of resource coordination information requested by the first UE is included by the set of available types of resource coordination information.

In some examples, to support identifying the set of available types of resource coordination information, the coordination type reception component 950 may be configured as or otherwise support a means for receiving an indication of the set of available types of resource coordination information.

In some examples, to support identifying the set of available types of resource coordination information, the memory component 955 may be configured as or otherwise support a means for reading a memory of the first UE to identify the set of available types of resource coordination information.

In some examples, the set of available types of resource coordination information is based on a resource pool allocated to the first UE.

In some examples, to support transmitting the request for the type of resource coordination information, the coordination type selection component 945 may be configured as or otherwise support a means for requesting the type of resource coordination information from the set of types of resource coordination information based on information associated with the second message.

In some examples, the information associated with the second message includes one or more of a cast type associated with the second message, a priority associated with the second message, a size of the second message, an MCS of the second message, a QoS associated with the second message, or a system resource utilization.

In some examples, transmitting the request for the type of resource coordination information is based on a satisfaction of a condition, the condition being associated with one or more of a cast type associated with the second message, a priority associated with the second message, a size of the second message, an MCS of the second message, a QoS associated with the second message, or a system resource utilization.

In some examples, the request is transmitted via one or more of SCI-2, a MAC-CE, or RRC signaling.

Additionally or alternatively, the communications manager 920 may support wireless communication at a second UE in accordance with examples as disclosed herein. In some examples, the coordination type indication component 925 may be configured as or otherwise support a means for receiving, from a first UE, a request for a type of resource coordination information from a set of types of resource coordination information. In some examples, the coordination information component 930 may be configured as or otherwise support a means for generating resource coordination information in accordance with the type of resource coordination information. In some examples, the coordination information component 930 may be configured as or otherwise support a means for transmitting, to the first UE, a first message indicating the resource coordination information generated in accordance with the type of resource coordination information.

In some examples, the coordination type selection component 945 may be configured as or otherwise support a means for identifying a set of available types of resource coordination information from the set of types of resource coordination information, where the type of resource coordination information requested by the first UE is included by the set of available types of resource coordination information.

In some examples, to support identifying the set of available types of resource coordination information, the coordination type reception component 950 may be configured as or otherwise support a means for receiving an indication of the set of available types of resource coordination information.

In some examples, to support identifying the set of available types of resource coordination information, the memory component 955 may be configured as or otherwise support a means for reading a memory of the second UE to identify the set of available types of resource coordination information.

In some examples, the coordination type transmission component 960 may be configured as or otherwise support a means for transmitting, to the first UE, an indication of the set of available types of resource coordination information.

In some examples, the set of available types of resource coordination information is based on a resource pool allocated to the first UE.

In some examples, to support receiving the request for the type of resource coordination information, the coordination type selection component 945 may be configured as or otherwise support a means for receiving the request for the type of resource coordination information from the set of types of resource coordination information based on information associated with a second message to be transmitted by the first UE.

In some examples, the information associated with the second message includes one or more of a cast type associated with the second message, a priority associated with the second message, a size of the second message, an MCS of the second message, a QoS associated with the second message, or a system resource utilization.

In some examples, the request is received via one or more of SCI-2, a MAC-CE, or RRC signaling.

Additionally or alternatively, the communications manager 920 may support wireless communication at a second UE in accordance with examples as disclosed herein. The sidelink transmission component 940 may be configured as or otherwise support a means for receiving, from a first UE, a first message indicating information associated with a transmission from the first UE. The coordination type selection component 945 may be configured as or otherwise support a means for determining a type of resource coordination information from a set of types of resource coordination information based on the information associated with the transmission from the first UE. In some examples, the coordination information component 930 may be configured as or otherwise support a means for transmitting, to the first UE, a second message indicating resource coordination information in accordance with the type of resource coordination information.

In some examples, the coordination type indication component 925 may be configured as or otherwise support a means for transmitting, to the first UE, messaging indicating the type of resource coordination information.

In some examples, to support transmitting the messaging indicating the type of resource coordination information, the coordination type indication component 925 may be configured as or otherwise support a means for transmitting, in the second message, an indication of the type of resource coordination information.

In some examples, to support transmitting the messaging indicating the type of resource coordination information, the coordination type indication component 925 may be configured as or otherwise support a means for indicating the type of resource coordination information based on a type of the second message.

In some examples, the type of the second message is associated with a channel over which the second message is transmitted.

In some examples, to support transmitting the messaging indicating the type of resource coordination information, the coordination type indication component 925 may be configured as or otherwise support a means for transmitting, to the first UE, a third message including an indication of the type of resource coordination information.

In some examples, the third message is transmitted as part of a connection establishment procedure with the first UE.

In some examples, to support determining the type of resource coordination information from the set of types of resource coordination information, the coordination information component 930 may be configured as or otherwise support a means for determining the type of resource coordination information based on one or more of a cast type associated with the transmission from the first UE, a priority associated with the transmission from the first UE, a size of the transmission from the first UE, an MCS of the transmission from the first UE, a QoS associated with the transmission from the first UE, or a system resource utilization.

In some examples, the information associated with the transmission from the first UE includes one or more of the cast type associated with the transmission from the first UE, the priority associated with the transmission from the first UE, the size of the transmission from the first UE, the MCS of the transmission from the first UE, the QoS associated with the transmission from the first UE, or the system resource utilization.

Figure 10:
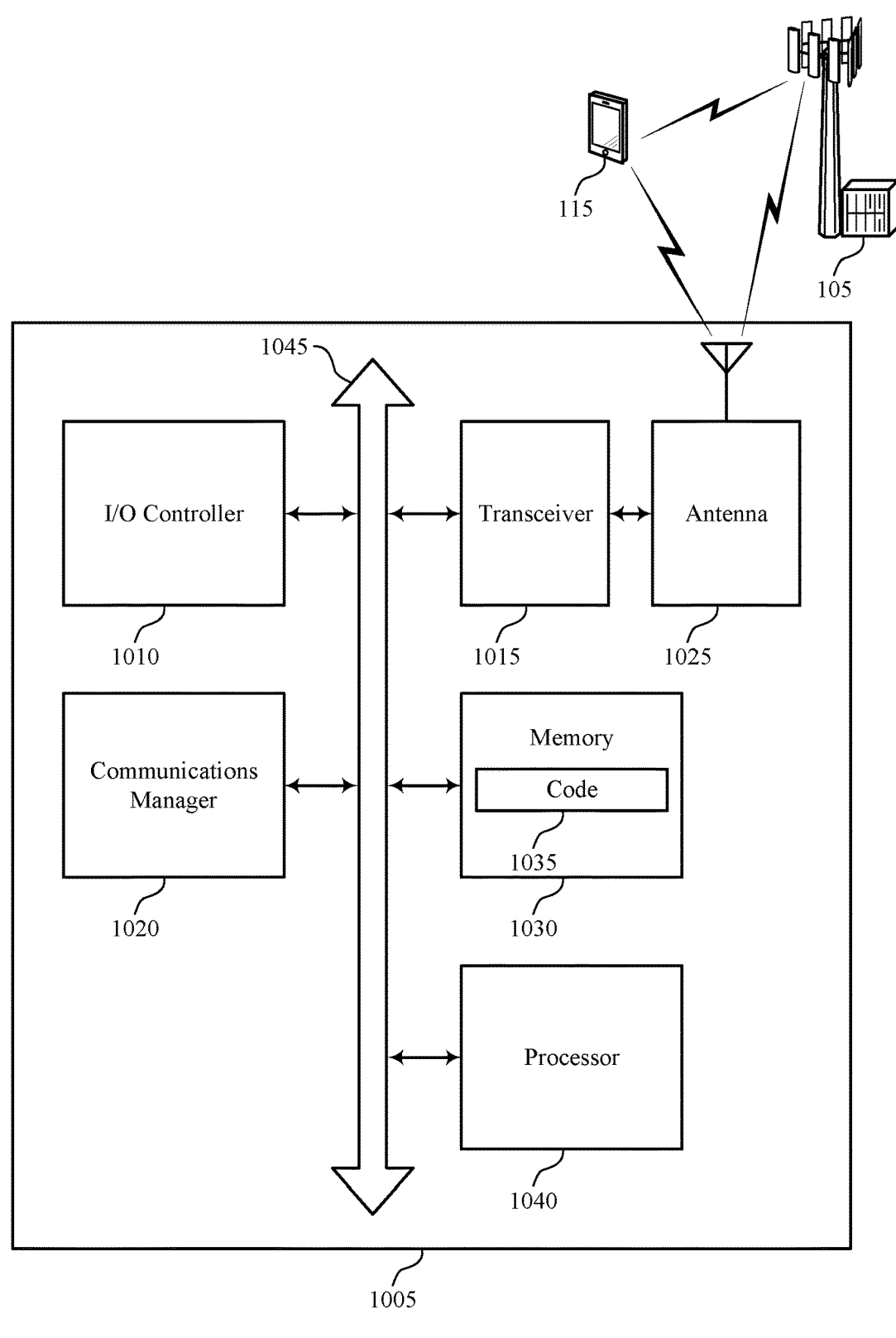
FIG. 10 shows a diagram of a system including a device that supports techniques for requesting a type of coordination information in accordance with aspects of the present disclosure.

FIG. 10 shows a diagram of a system 1000 including a device 1005 that supports techniques for requesting a type of coordination information in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code

1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for requesting a type of coordination information). For example, the device 1005 or a component of the device 1005 may include a processor 1040 and memory 1030 coupled to or coupled with the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for transmitting, to a second UE, a request for a type of resource coordination information from a set of types of resource coordination information. The communications manager 1020 may be configured as or otherwise support a means for receiving, from the second UE, a first message indicating resource coordination information in accordance with the type of resource coordination information. The communications manager 1020 may be configured as or otherwise support a means for transmitting a second message over a set of sidelink resources, the set of sidelink resources based on the resource coordination information.

Additionally or alternatively, the communications manager 1020 may support wireless communication at a second UE in accordance with examples as disclosed herein. For example, the communications manager 1020 may be configured as or otherwise support a means for receiving, from a first UE, a request for a type of resource coordination information from a set of types of resource coordination information. The communications manager 1020 may be configured as or otherwise support a means for generating resource coordination information in accordance with the type of resource coordination information. The communications manager 1020 may be configured as or otherwise support a means for transmitting, to the first UE, a first message indicating the resource coordination information generated in accordance with the type of resource coordination information.

Additionally or alternatively, the communications manager 1020 may support wireless communication at a second UE in accordance with examples as disclosed herein. For example, the communications manager 1020 may be configured as or otherwise support a means for receiving, from a first UE, a first message indicating information associated with a transmission from the first UE. The communications manager 1020 may be configured as or otherwise support a means for determining a type of resource coordination information from a set of types of resource coordination information based on the information associated with the transmission from the first UE. The communications manager 1020 may be configured as or otherwise support a means for transmitting, to the first UE, a second message indicating resource coordination information in accordance with the type of resource coordination information.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for requesting a type of coordination information as described herein, or the processor 1040 and the memory 1030 may be otherwise configured to perform or support such operations.

FIG. 11 shows a flowchart illustrating a method 1100 that supports techniques for requesting a type of coordination information in accordance with aspects of the present disclosure. The operations of the method 1100 may be implemented by a UE or its components as described herein. For example, the operations of the method 1100 may be performed by a UE 115 as described with reference to FIGS. 1 through 10.

In some examples, a UE may execute a set of instructions to control the functional elements of the UE to perform the described functions. Additionally or alternatively, the UE may perform aspects of the described functions using special-purpose hardware.

At 1105, the method may include transmitting, to a second UE, a request for a type of resource coordination information from a set of types of resource coordination information. The operations of 1105 may be performed in accordance with examples as disclosed herein. In some examples, aspects of the operations of 1105 may be performed by a coordination type indication component 925 as described with reference to FIG. 9.

At 1110, the method may include receiving, from the second UE, a first message indicating resource coordination information in accordance with the type of resource coordination information. The operations of 1110 may be performed in accordance with examples as disclosed herein. In some examples, aspects of the operations of 1110 may be performed by a coordination information component 930 as described with reference to FIG. 9.

At 1115, the method may include transmitting a second message over a set of sidelink resources, the set of sidelink resources based on the resource coordination information. The operations of 1115 may be performed in accordance with examples as disclosed herein. In some examples, aspects of the operations of 1115 may be performed by a resource selection component 935 as described with reference to FIG. 9.

FIG. 12 shows a flowchart illustrating a method 1200 that supports techniques for requesting a type of coordination information in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a first UE, a request for a type of resource coordination information from a set of types of resource coordination information. The operations of 1205 may be performed in accordance with examples as disclosed herein. In some examples, aspects of the operations of 1205 may be performed by a coordination type indication component 925 as described with reference to FIG. 9.

At 1210, the method may include generating resource coordination information in accordance with the type of resource coordination information. The operations of 1210 may be performed in accordance with examples as disclosed herein. In some examples, aspects of the operations of 1210 may be performed by a coordination information component 930 as described with reference to FIG. 9.

At 1215, the method may include transmitting, to the first UE, a first message indicating the resource coordination information generated in accordance with the type of resource coordination information. The operations of 1215 may be performed in accordance with examples as disclosed herein. In some examples, aspects of the operations of 1215 may be performed by a coordination information component 930 as described with reference to FIG. 9.

FIG. 13 shows a flowchart illustrating a method 1300 that supports techniques for requesting a type of coordination information in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a first UE, a first message indicating information associated with a transmission from the first UE. The operations of 1305 may be performed in accordance with examples as disclosed herein. In some examples, aspects of the operations of 1305 may be performed by a sidelink transmission component 940 as described with reference to FIG. 9.

At 1310, the method may include determining a type of resource coordination information from a set of types of resource coordination information based on the information associated with the transmission from the first UE. The operations of 1310 may be performed in accordance with examples as disclosed herein. In some examples, aspects of the operations of 1310 may be performed by a coordination type selection component 945 as described with reference to FIG. 9.

At 1315, the method may include transmitting, to the first UE, a second message indicating resource coordination information in accordance with the type of resource coordination information. The operations of 1315 may be performed in accordance with examples as disclosed herein. In some examples, aspects of the operations of 1315 may be performed by a coordination information component 930 as described with reference to FIG. 9.

The following provides an overview of aspects of the present disclosure:

Aspect 1: A method for wireless communication at a first UE, comprising: transmitting, to a second UE, a request for a type of resource coordination information from a set of types of resource coordination information; receiving, from the second UE, a first message indicating resource coordination information in accordance with the type of resource coordination information; and transmitting a second message over a set of sidelink resources, the set of sidelink resources based at least in part on the resource coordination information.

Aspect 2: The method of aspect 1, further comprising: identifying a set of available types of resource coordination information from the set of types of resource coordination information, wherein the type of resource coordination information requested by the first UE is comprised by the set of available types of resource coordination information.

Aspect 3: The method of aspect 2, wherein identifying the set of available types of resource coordination information comprises: receiving an indication of the set of available types of resource coordination information.

Aspect 4: The method of any of aspects 2 or 3, wherein identifying the set of available types of resource coordination information comprises: reading a memory of the first UE to identify the set of available types of resource coordination information.

Aspect 5: The method of any of aspects 2 through 4, wherein the set of available types of resource coordination information is based at least in part on a resource pool allocated to the first UE.

Aspect 6: The method of any of aspects 1 through 5, wherein transmitting the request for the type of resource coordination information comprises: requesting the type of resource coordination information from the set of types of resource coordination information based at least in part on information associated with the second message.

Aspect 7: The method of aspect 6, wherein the information associated with the second message comprises one or more of a cast type associated with the second message, a priority associated with the second message, a size of the second message, a MCS of the second message, a QoS associated with the second message, or a system resource utilization.

Aspect 8: The method of any of aspects 1 through 7, wherein transmitting the request for the type of resource coordination information is based at least in part on a satisfaction of a condition, the condition being associated with one or more of a cast type associated with the second message, a priority associated with the second message, a size of the second message, an MCS of the second message, a QoS associated with the second message, or a system resource utilization.

Aspect 9: The method of any of aspects 1 through 8, wherein the request is transmitted via one or more of SCI-2, a MAC-CE, or RRC signaling.

Aspect 10: A method for wireless communication at a second UE, comprising: receiving, from a first UE, a request for a type of resource coordination information from a set of types of resource coordination information; generating resource coordination information in accordance with the type of resource coordination information; and transmitting, to the first UE, a first message indicating the resource coordination information generated in accordance with the type of resource coordination information.

Aspect 11: The method of aspect 10, further comprising: identifying a set of available types of resource coordination information from the set of types of resource coordination information, wherein the type of resource coordination information requested by the first UE is comprised by the set of available types of resource coordination information.

Aspect 12: The method of aspect 11, wherein identifying the set of available types of resource coordination information comprises: receiving an indication of the set of available types of resource coordination information.

Aspect 13: The method of any of aspects 11 or 12, wherein identifying the set of available types of resource coordination information comprises: reading a memory of the second UE to identify the set of available types of resource coordination information.

Aspect 14: The method of any of aspects 11 through 13, further comprising: transmitting, to the first UE, an indication of the set of available types of resource coordination information.

Aspect 15: The method of any of aspects 11 through 14, wherein the set of available types of resource coordination information is based at least in part on a resource pool allocated to the first UE.

Aspect 16: The method of any of aspects 10 through 15, wherein receiving the request for the type of resource coordination information comprises: receiving the request for the type of resource coordination information from the set of types of resource coordination information based at least in part on information associated with a second message to be transmitted by the first UE.

Aspect 17: The method of aspect 16, wherein the information associated with the second message comprises one or more of a cast type associated with the second message, a priority associated with the second message, a size of the second message, an MCS of the second message, a QoS associated with the second message, or a system resource utilization.

Aspect 18: The method of any of aspects 10 through 17, wherein the request is received via one or more of SCI-2, a MAC-CE, or RRC signaling.

Aspect 19: A method for wireless communication at a second UE, comprising: receiving, from a first UE, a first message indicating information associated with a transmission from the first UE; determining a type of resource coordination information from a set of types of resource coordination information based at least in part on the information associated with the transmission from the first UE; and transmitting, to the first UE, a second message indicating resource coordination information in accordance with the type of resource coordination information.

Aspect 20: The method of aspect 19, further comprising: transmitting, to the first UE, messaging indicating the type of resource coordination information.

Aspect 21: The method of aspect 20, wherein transmitting the messaging indicating the type of resource coordination information comprises: transmitting, in the second message, an indication of the type of resource coordination information.

Aspect 22: The method of aspect 20, wherein transmitting the messaging indicating the type of resource coordination information comprises: indicating the type of resource coordination information based at least in part on a type of the second message.

Aspect 23: The method of aspect 22, wherein the type of the second message is associated with a channel over which the second message is transmitted.

Aspect 24: The method of aspect 20, wherein transmitting the messaging indicating the type of resource coordination information comprises: transmitting, to the first UE, a third message including an indication of the type of resource coordination information.

Aspect 25: The method of aspect 24, wherein the third message is transmitted as part of a connection establishment procedure with the first UE.

Aspect 26: The method of any of aspects 19 through 25, wherein determining the type of resource coordination information from the set of types of resource coordination information comprises: determining the type of resource coordination information based at least in part on one or more of a cast type associated with the transmission from the first UE, a priority associated with the transmission from the first UE, a size of the transmission from the first UE, an MCS of the transmission from the first UE, a QoS associated with the transmission from the first UE, or a system resource utilization.

Aspect 27: The method of aspect 26, wherein the information associated with the transmission from the first UE comprises one or more of the cast type associated with the transmission from the first UE, the priority associated with the transmission from the first UE, the size of the transmission from the first UE, the MCS of the transmission from the first UE, the QoS associated with the transmission from the first UE, or the system resource utilization.

Aspect 28: An apparatus for wireless communication at a first UE, comprising a processor; memory coupled with the processor; and instructions stored in the memory and executable by the processor to cause the apparatus to perform a method of any of aspects 1 through 9.

Aspect 29: An apparatus for wireless communication at a first UE, comprising at least one means for performing a method of any of aspects 1 through 9.

Aspect 30: A non-transitory computer-readable medium storing code for wireless communication at a first UE, the code comprising instructions executable by a processor to perform a method of any of aspects 1 through 9.

Aspect 31: An apparatus for wireless communication at a second UE, comprising a processor; memory coupled with the processor; and instructions stored in the memory and executable by the processor to cause the apparatus to perform a method of any of aspects 10 through 18.

Aspect 32: An apparatus for wireless communication at a second UE, comprising at least one means for performing a method of any of aspects 10 through 18.

Aspect 33: A non-transitory computer-readable medium storing code for wireless communication at a second UE, the code comprising instructions executable by a processor to perform a method of any of aspects 10 through 18.

Aspect 34: An apparatus for wireless communication at a second UE, comprising a processor; memory coupled with the processor; and instructions stored in the memory and executable by the processor to cause the apparatus to perform a method of any of aspects 19 through 27.

Aspect 35: An apparatus for wireless communication at a second UE, comprising at least one means for performing a method of any of aspects 19 through 27.

Aspect 36: A non-transitory computer-readable medium storing code for wireless communication at a second UE, the code comprising instructions executable by a processor to perform a method of any of aspects 19 through 27.

It should be noted that the methods described herein describe possible implementations, and that the operations and the steps may be rearranged or otherwise modified and that other implementations are possible. Further, aspecst from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   determining that a transmission priority associated with a unicast message to be transmitted by the first UE satisfies one or more thresholds;
   selecting, based at least in part on determining that the transmission priority satisfies the one or more thresholds, a type of resource coordination information from a set of types resource coordination information that comprises a preferred resource set or a non-preferred resource set;
   transmitting, to a second UE and via second stage sidelink control information, a request for the type of resource coordination information from the set of types of resource coordination information, wherein the request comprises an indication of the transmission priority of the unicast message;
   receiving, from the second UE, a first message indicating resource coordination information in accordance with the type of resource coordination information and the transmission priority; and
   transmitting the unicast message over a set of sidelink resources, the set of sidelink resources based at least in part on the resource coordination information.

2. The method of claim 1, further comprising:
   identifying a set of available types of resource coordination information from the set of types of resource coordination information, wherein the type of resource coordination information requested by the first UE is comprised by the set of available types of resource coordination information.

3. The method of claim 2, wherein identifying the set of available types of resource coordination information comprises:
   receiving an indication of the set of available types of resource coordination information.

4. The method of claim 2, wherein identifying the set of available types of resource coordination information comprises:
   reading memory of the first UE to identify the set of available types of resource coordination information.

5. The method of claim 2, wherein the set of available types of resource coordination information is based at least in part on a resource pool allocated to the first UE.

6. The method of claim 1, wherein transmitting the request for the type of resource coordination information comprises:
   requesting the type of resource coordination information from the set of types of resource coordination information based at least in part on information to be included in the unicast message.

7. The method of claim 1, wherein the type of resource coordination information from the set of types of resource coordination information is based on a condition that is associated with one or more of a cast type associated with the unicast message, a size of the unicast message, a modulation and coding scheme of the unicast message, a quality of service associated with the unicast message, or a system resource utilization.

8. A method for wireless communication at a second user equipment (UE), comprising:

receiving, from a first UE and via second stage sidelink control information, a request for a type of resource coordination information from a set of types of resource coordination information that comprises a preferred resources set or a non-preferred resource set, wherein the request comprises an indication of a transmission priority of a unicast message to be transmitted by the first UE;

determining that the transmission priority associated with the unicast message to be transmitted by the first UE satisfies one or more thresholds;

selecting, based at least in part on determining that the transmission priority satisfies the one or more thresholds, the type of resource coordination information from the set of types resource coordination information; and transmitting, to the first UE, a first message indicating the resource coordination information in accordance with the type of resource coordination information and the transmission priority.

9. The method of claim 8, further comprising:

identifying a set of available types of resource coordination information from the set of types of resource coordination information, wherein the type of resource coordination information requested by the first UE is comprised by the set of available types of resource coordination information.

10. The method of claim 9, wherein identifying the set of available types of resource coordination information comprises:

receiving an indication of the set of available types of resource coordination information.

11. The method of claim 9, wherein identifying the set of available types of resource coordination information comprises:

reading memory of the second UE to identify the set of available types of resource coordination information.

12. The method of claim 9, further comprising:

transmitting, to the first UE, an indication of the set of available types of resource coordination information.

13. The method of claim 9, wherein the set of available types of resource coordination information is based at least in part on a resource pool allocated to the first UE.

14. The method of claim 8, wherein receiving the request for the type of resource coordination information comprises:

receiving the request for the type of resource coordination information from the set of types of resource coordination information based at least in part on information to be included in the unicast message.

15. The method of claim 8, wherein the type of resource coordination information from the set of types of resource coordination information is based on a condition that is associated with one or more of a cast type associated with a unicast message, a size of the unicast message, a modulation and coding scheme of the unicast message, a quality of service associated with the unicast message, or a system resource utilization.

16. A second user equipment (UE), comprising:

one or more transceivers;

one or more memories storing processor-executable code; and one or more processors coupled with the one or more memories and individually or collectively operable to execute the code to cause the second UE to:

receive, from a first UE and via second stage sidelink control information and the one or more transceivers, a request for a type of resource coordination information from a set of types of resource coordination information that comprises a preferred resources set or a non-preferred resource set, wherein the request comprises an indication of a transmission priority of a unicast message to be transmitted by the first UE;

determine that the transmission priority associated with the unicast message to be transmitted by the first UE satisfies one or more thresholds;

select, based at least in part on determining that the transmission priority satisfies the one or more thresholds, the type of resource coordination information from the set of types resource coordination information;

and transmit to the first UE and via the one or more transceivers, a second message indicating resource coordination information in accordance with the type of resource coordination information and the transmission priority.

17. The second UE of claim 16, wherein the type of resource coordination information is based at least in part on a mapping between cast types associated with transmission from the first UE and the set of types of resource coordination information.

18. The second UE of claim 16, wherein the type of resource coordination information is based at least in part on a type of the second message.

19. The second UE of claim 16, wherein the type of resource coordination information is based at least in part on a channel over which the second message is transmitted.

20. The second UE of claim 16, wherein the type of resource coordination information from the set of types of resource coordination information is based on a condition that is associated with one or more of a cast type associated with the unicast message, a size of the second message, a modulation and coding scheme of the unicast message, a quality of service associated with the second message, or a system resource utilization.

21. A first user equipment (UE), comprising:

one or more transceivers;

one or more memories storing processor-executable code; and one or more processors coupled with the one or more memories and individually or collectively operable to execute the code to cause the first UE to:

determine that a transmission priority associated with a unicast message to be transmitted by the first UE satisfies one or more thresholds;

select, based at least in part on determining that the transmission priority satisfies the one or more thresholds, a type of resource coordination information from a set of types resource coordination information that comprises a preferred resource set or a non-preferred resource set;

transmit, to a second UE via the one or more transceivers and via second stage sidelink control information, a request for the type of resource coordination information from the set of types of resource coordination information, wherein the request comprises an indication of the transmission priority of the unicast message;

receive, from the second UE via the one or more transceivers, a first message indicating resource coordination information in accordance with the type of resource coordination information and the transmission priority; and transmit, via the one or more transceivers the unicast message over a set of sidelink resources, the set of sidelink resources based at least in part on the resource coordination information.

22. The first UE of claim 21, wherein the one or more processors are individually or collectively further operable to execute the code to cause the first UE to:

identify a set of available types of resource coordination information from the set of types of resource coordination information, wherein the type of resource coordination information requested by the first UE is comprised by the set of available types of resource coordination information.

23. The first UE of claim 22, wherein to identify the set of available types of resource coordination information, the one or more processors are individually or collectively further operable to execute the code to cause the first UE to:

receive, via the one or more transceivers, an indication of the set of available types of resource coordination information.

24. The first UE of claim 21, wherein the type of resource coordination information from the set of types of resource coordination information is based on a condition that is associated with one or more of a cast type associated with the unicast message, a size of the unicast message, a modulation and coding scheme of the unicast message, a quality of service associated with the unicast message, or a system resource utilization.

* * * * *